(12) United States Patent
Pasek et al.

(10) Patent No.: US 7,210,923 B2
(45) Date of Patent: May 1, 2007

(54) HOPPER SYSTEM FOR A PATTY-FORMING APPARATUS

(75) Inventors: James E. Pasek, Tinley Park, IL (US); Salvatore Lamartino, Orland Park, IL (US)

(73) Assignee: Formax, Inc., Mokena, IL (US)

( * ) Notice: Subject to any disclaimer, the term of this patent is extended or adjusted under 35 U.S.C. 154(b) by 113 days.

(21) Appl. No.: 10/942,620

(22) Filed: Sep. 16, 2004

(65) Prior Publication Data
US 2005/0072312 A1   Apr. 7, 2005

Related U.S. Application Data

(60) Provisional application No. 60/515,585, filed on Oct. 29, 2003, provisional application No. 60/503,354, filed on Sep. 16, 2003.

(51) Int. Cl.
*A22C 7/00* (2006.01)

(52) U.S. Cl. ............... 425/574; 425/225; 425/192 R; 425/188; 425/190

(58) Field of Classification Search ............ 425/574, 425/225, 192 R, 188, 190; *A22C 7/00*
See application file for complete search history.

(56) References Cited

U.S. PATENT DOCUMENTS

| | | | |
|---|---|---|---|
| 3,952,478 A | 4/1976 | Richards et al. | |
| 4,054,967 A | 10/1977 | Sandberg et al. | |
| RE30,096 E | 9/1979 | Richards | |
| 4,182,003 A | 1/1980 | Lamartino et al. | |
| 4,356,595 A | 11/1982 | Sandberg et al. | |
| 4,372,008 A | 2/1983 | Sandberg | |
| 4,435,143 A * | 3/1984 | Dempsey | 425/150 |
| 4,821,376 A | 4/1989 | Sandberg | |
| 4,996,743 A | 3/1991 | Janssen | |
| 5,145,454 A | 9/1992 | Sandberg et al. | |
| 5,553,985 A * | 9/1996 | Schack et al. | 414/287 |
| 2001/0038865 A1 * | 11/2001 | Lindee et al. | 425/225 |

OTHER PUBLICATIONS

Robot 500 Continuous Automatic Vacuum Sausage Filling Machine, 1991, 6 pages, Vemag Maschinenebau GMBH.
Introducing the Formax F-400, 2 pages, Formax, Inc., Admitted Prior Art.
Formax 6, 6 pages, Formax, Inc., Admitted Prior Art.
Illustration 1, F-26C Manual, 1997, 1 page, Formax, Inc.
Illustration 13, F-26C Manual, 1997, 1 page, Formax, Inc.

* cited by examiner

*Primary Examiner*—Yogendra N. Gupta
*Assistant Examiner*—Maria Veronica Ewald
(74) *Attorney, Agent, or Firm*—The Law Office of Randall T. Erickson, P.C.

(57) ABSTRACT

A food product hopper assembly is provided for a food patty molding machine. The food product hopper of the assembly is configured for containing a supply of food product and is in flow-communication with a food delivery apparatus for discharging food product from the hopper. The hopper is hinged along one side to a machine housing and can be pivoted upwardly to reveal a hopper bottom for cleaning and inspection. Hopper sidewalls define an open bottom face and the food delivery apparatus comprises a hopper conveyor having a top conveying surface closing a substantial portion of the open bottom face. The hinge arrangement comprises a hinge shaft fixed to the hopper and supports carried by the housing, the support having an aperture wherein the hinge shaft is journaled for rotation about an axis of the shaft by the aperture. A lever fixed to the shaft, and an actuator connected to a position on the lever eccentrically located with respect to the axis of the shaft, are used to exert a movement on the shaft to pivot the hopper. The conveyor is also arranged to pivot about an axis of the shaft for cleaning, inspection and maintenance.

26 Claims, 17 Drawing Sheets

HOPPER SYSTEM FOR A PATTY-FORMING APPARATUS

This application claims the benefit of U.S. provisional application Ser. No. 60/503,354, filed Sep. 16, 2003, and U.S. provisional application Ser. No. 60/515,585, filed Oct. 29, 2003.

BACKGROUND OF THE INVENTION

Use of pre-processed foods, both in homes and in restaurants, has created a demand for high-capacity automated food processing equipment. That demand is particularly evident with respect to hamburgers, molded steaks, fish cakes, and other molded food patties.

Food processors utilize high-speed molding machines, such as FORMAX F-6, F-12, F-19, F-26 or F400 reciprocating mold plate forming machines, available from Formax, Inc. of Mokena, Ill., U.S.A., for supplying patties to the fast food industry. Prior known high-speed molding machines are also described for example in U.S. Pat. Nos. 3,887,964; 4,372,008; 4,356,595; 4,821,376; and 4,996,743 herein incorporated by reference.

Food processors must clean and sanitize such high-speed molding machines often. To properly clean, the hopper must be removed to access the conveyor and associated parts beneath the hopper.

Although heretofore known FORMAX patty-molding machines have achieved commercial success and wide industry acceptance, the present inventors have recognized that needs exist for a forming machine having an enhanced maintainability and an increased ease of cleaning.

SUMMARY OF THE INVENTION

The present invention provides an improved food product hopper assembly for a food patty molding apparatus. The food product hopper of the assembly is configured for containing a supply of food product and is in flow-communication with a food delivery apparatus for discharging food product from the hopper.

According to one aspect of the invention, the hopper is hinged along one side to a machine housing or framework and can be pivoted upwardly to reveal a hopper bottom for cleaning and inspection.

According to the preferred embodiment, the hopper has an open bottom face and the food delivery apparatus comprises a hopper conveyor having a top conveying surface, closing a substantial portion of the open bottom face.

The hinge arrangement comprises a hinge shaft fixed to the hopper and at least one support carried by the machine housing. The support has an aperture wherein the hinge shaft is journaled for rotation about an axis of the shaft by the aperture.

The hinge arrangement comprises a lever fixed to the shaft, and an actuator connected to a position on the lever eccentrically located with respect to the axis of the shaft, the actuator operative to exert a force on the lever to rotate the shaft and the hopper.

Preferably, the conveyor is also arranged to pivot about an axis of the shaft, and the actuator is configured to pivot both the hopper and the conveyor. The actuator is operative to pivot the hopper to an angle greater than 45 degrees and the conveyor to a lesser angle. Preferably, the actuator is configured to pivot the conveyor about 30 degrees or less.

According to a further aspect of the invention, the hopper comprises a unitary part. Because there are no joints or bolted seams, a smooth and easily cleanable surface is provided by the hopper.

According to a further aspect of the invention, a food patty molding machine is provided that includes a housing; a food product hopper having a surrounding side wall configured for containing a supply of food product and an open bottom; a conveyor having a top conveying surface closing the open bottom, the top conveying surface for transporting food product within the hopper; a food patty molding mechanism that receives food product from the conveyor and molds individual patties from the food product; a hinge arrangement having a pivot axis along one side, the hinge arrangement carried between the hopper and the housing, the hinge arrangement configured to allow the hopper to pivot with respect to the housing from an operative position to a maintenance position.

The food patty molding apparatus can comprise a food pump that pressurizes food product received from the conveyor, and a reciprocating mold plate having patty-forming cavities therein that receive pressurized food product from the food pump, and a knock out mechanism that mechanically removes formed patties from the cavities.

According to a further aspect of the invention, in a food patty molding apparatus having a food product hopper configured for containing a supply of food product and in flow-communication with a food delivery apparatus for discharging food product from the hopper, a level sensing mechanism is located at least partially in the hopper. The level sensing mechanism comprises a food material engaging member arranged to be moved by food product within the hopper, a pneumatic cylinder operatively connected to the engaging member and to the hopper, and a sensing element. The pneumatic cylinder exerts a selectable resistance to movement of the engaging member. A sensing element is arranged to receive a proximity signal corresponding to movement of the engaging member, to sense level of food product within the hopper.

Preferably, the food product engaging member is mounted to pivot with respect to the hopper. The engaging member comprises a food engaging leg and a bent-off leg. The pneumatic cylinder is arranged to exert a force on the bent-off leg to oppose pivoting of the engaging leg under pressure from a level of food product within the hopper.

The level sensing mechanism is signal-connected to the machine control. Upon sensing a high level of food product at a forward end of the hopper, the hopper conveyor can be stopped.

The invention provides a patty forming machine with a reduced number of mechanical components. The hopper assembly can be quickly and easily disassembled for cleaning and sanitation. The patty forming machine can be easily converted to have the hopper hinge located on either side of the machine. This can be used to accommodate tight working areas or to allow processors to minimize labor in multiple machine operations, i.e., allowing one operator to control two side-by-side machines, each machine facing toward the operator. By providing a pivotal hopper, no heavy removable parts are present which must be entirely removed for maintenance and cleaning, and which can become damaged.

According to the invention the conveyor can be automatically pivoted upwardly with the hopper by the actuator. The hopper conveyor belt can then be easily removed. Worn belts can be easily replaced. The hopper, feed screw pumps, conveyor assembly and pump box are more accessible for wash down after the hopper is pivoted upwardly.

Numerous other advantages and features of the present invention will be become readily apparent from the following detailed description of the invention and the embodiments thereof, and from the accompanying drawings.

DETAILED DESCRIPTION OF THE PREFERRED EMBODIMENTS

Figure 1:
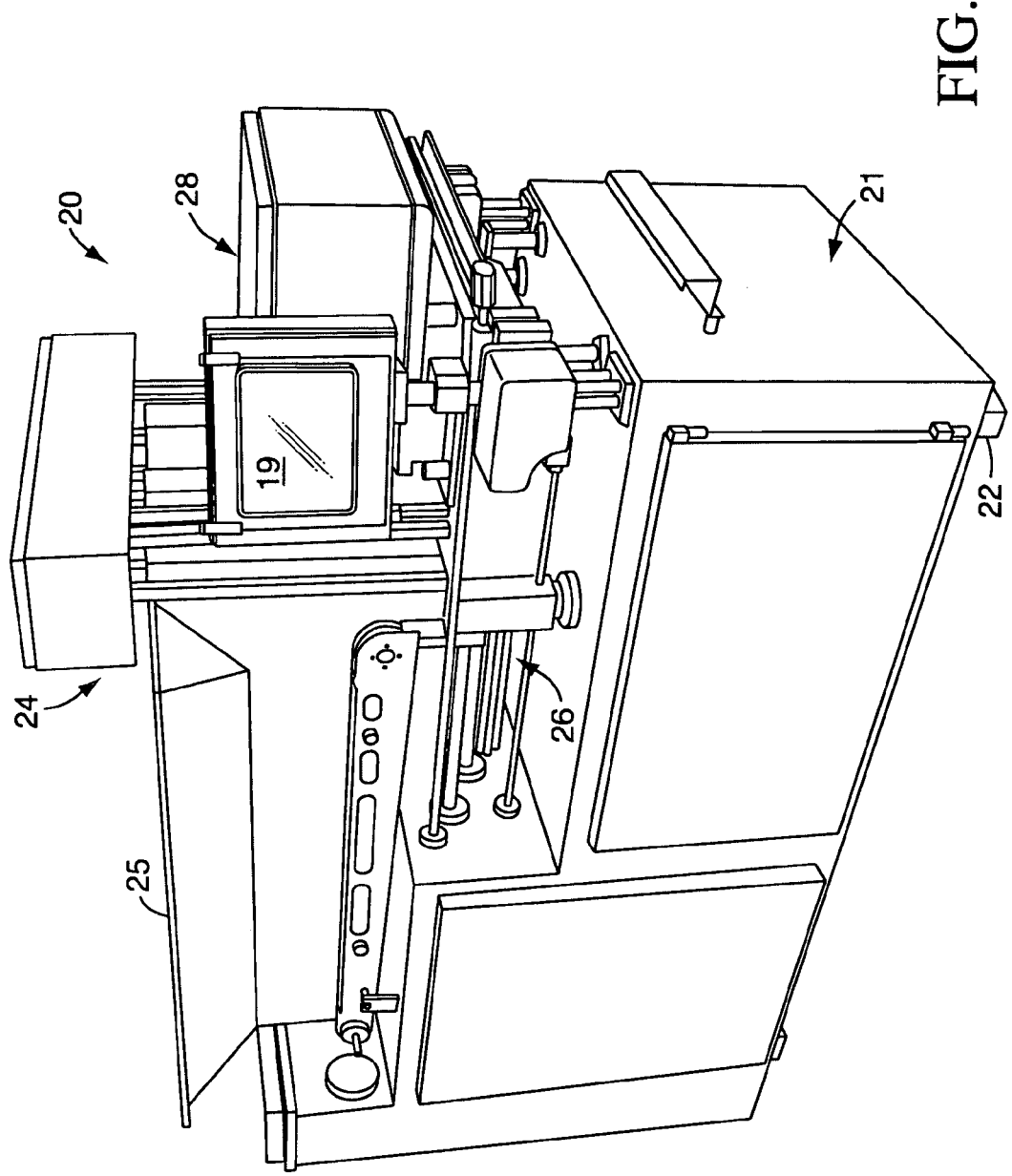
FIG. 1 is a perspective view of a patty-forming machine of the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

General Description of the Apparatus

The high-speed food patty molding machine 20 illustrated in the figures comprises a preferred embodiment of the invention. The complete machine is described in U.S. Ser. No. 10/942627, filed on the same day as the present application, and herein incorporated by reference. This application also incorporates by reference U.S. Application Ser. No. 60/503,354, filed Sep. 16, 2003 and U.S. Provisional Application Ser. No. 60/515,585, filed Oct. 29, 2003.

The molding machine 20 includes a machine base 21, having a base plate 21a preferably mounted upon a plurality of feet 22, rollers or wheels. The machine base 21 supports the operating mechanism for machine 20 and can contains hydraulic actuating systems, electrical actuating systems, and most of the machine controls. The machine 20 includes a supply 24 for supplying moldable food material, such as ground beef, fish, or the like, to the processing mechanisms of the machine.

A control panel 19, such as a touch screen control panel, is arranged on a forward end of the apparatus 20 and communicates with a machine controller.

As generally illustrated in FIGS. 2–6, supply means 24 comprises a large food material storage hopper 25 that opens into the intake of a food pump system 26. The food pump system 26 includes at least two food pumps 61, 62, described in detail hereinafter, that continuously, or intermittently under a pre-selected control scheme, pump food material, under pressure, into a manifold 27 flow-connected to a cyclically operated molding mechanism 28.

In the operation of machine 20, a supply of ground beef or other moldable food material is deposited into hopper 25 from overhead. An automated refill device (not shown) can be used to refill the hopper when the supply of food product therein is depleted. The hopper 25 includes a surrounding sidewall 25b that defines an open top end 25c and an open bottom face 25d. A conveyor 30 includes a conveyor belt 31 having a top conveying surface 31a that closes a substantial portion of the bottom face 25d to a hopper forward end 25a. The conveyor belt 31 moves food material longitudinally of the hopper 25 to the forward end 25a.

The food material is moved by supply means 24 into the intake of plunger pumps 61, 62 of pumping system 26. The pumps 61, 62 of system 26 operate in overlapping alteration to each other; and at any given time when machine 20 is in operation, at least one of the pumps is forcing food material under pressure into the intake of manifold 27.

Figure 1A:
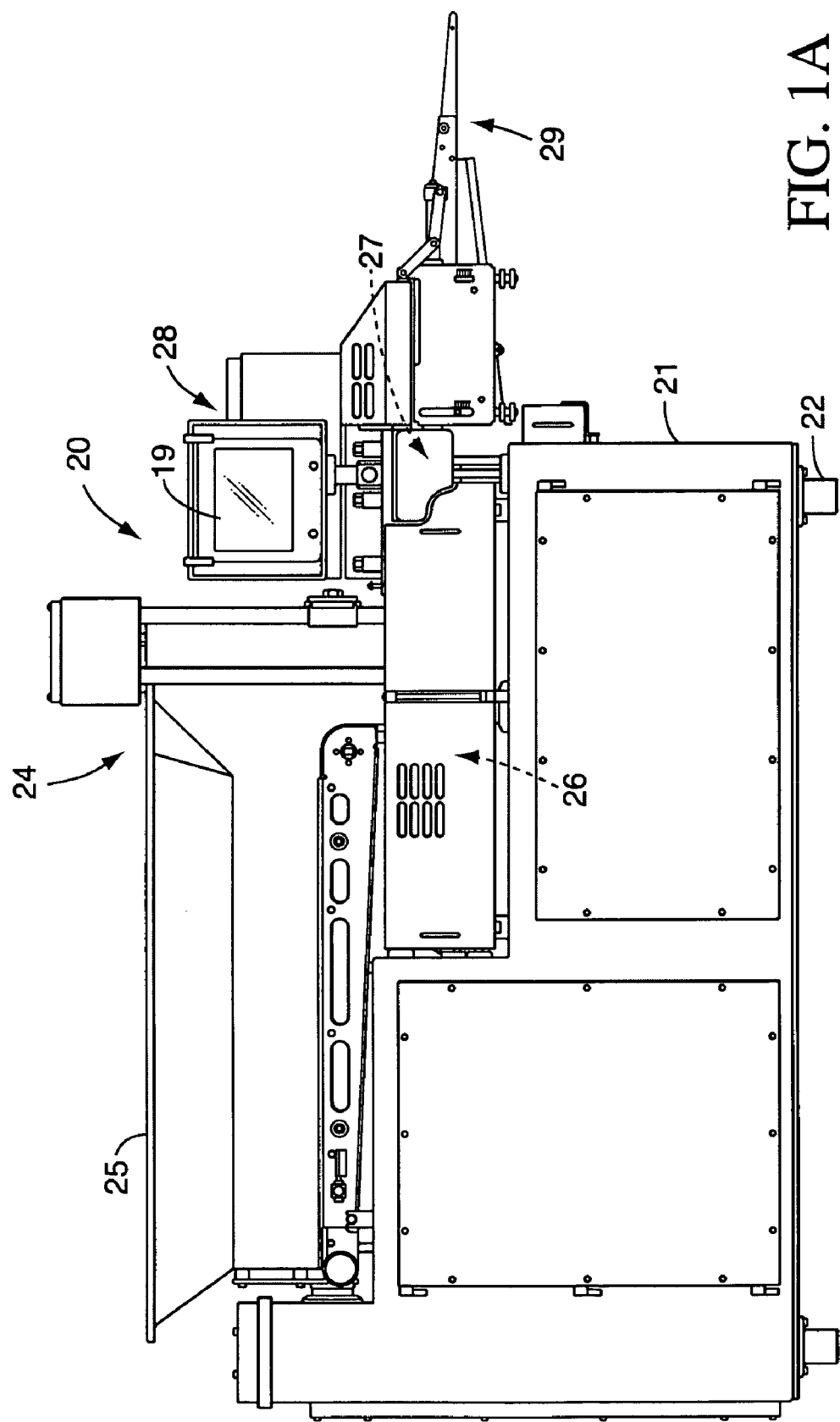
FIG. 1A is an elevational view of the patty-forming machine of FIG. 1.

The manifold 27 comprises a system for feeding the food material, still under relatively high pressure, into the molding mechanism 28. Molding mechanism 28 operates on a cyclic basis, first sliding a multi-cavity mold plate 32 into a receiving or cavity fill position over manifold 27 (FIG. 9A) and then away from the manifold to a patty discharge position (FIG. 9B) aligned with a series of knock out cups 33. When the mold plate 32 is at its discharge position, knock out cups plungers or cups 33 are driven downwardly as indicated by 33A in FIG. 2, discharging hamburgers or other molded patties from machine 20. The molded patties are deposited onto a conveyor 29 (FIG. 1A), to be transported away from the apparatus 20.

Food Supply System

The food supply means 24 and associated hopper 25 are illustrated in FIGS. 2–6. As seen, the conveyor belt 31 spans completely across the bottom of hopper 25, around an end of idler roller or pulley 35 and drive roller or pulley 36, the lower portion of the belt being engaged by a tensioning roller 37. In some cases the tensioning roller 37 may not be necessary, and can be eliminated. A drum motor (not visible) is provided within the drive roller 36 for rotating the drive roller.

The belt 31 can include a longitudinal V-shaped rib on an inside surface thereof that fits within a V-shaped cross sectional notch provided on the rollers 35, 36 to maintain a lateral centering of the belt during operation.

The forward end 25a of hopper 25 communicates with a vertical pump 38 having an outlet 39 at least partly open into a pump intake manifold chamber 41. A vertically oriented frame 42 extends above hopper 25 adjacent the right-hand side of the outlet 39. A motor housing 40 is mounted on top of the frame 42. A support plate 43 is affixed to the upper portion of frame 42 extending over the outlet 39 in hopper 25. The frame comprises four vertical tie rods 44a surrounded by spacers 44b (FIG. 5).

Figure 5:
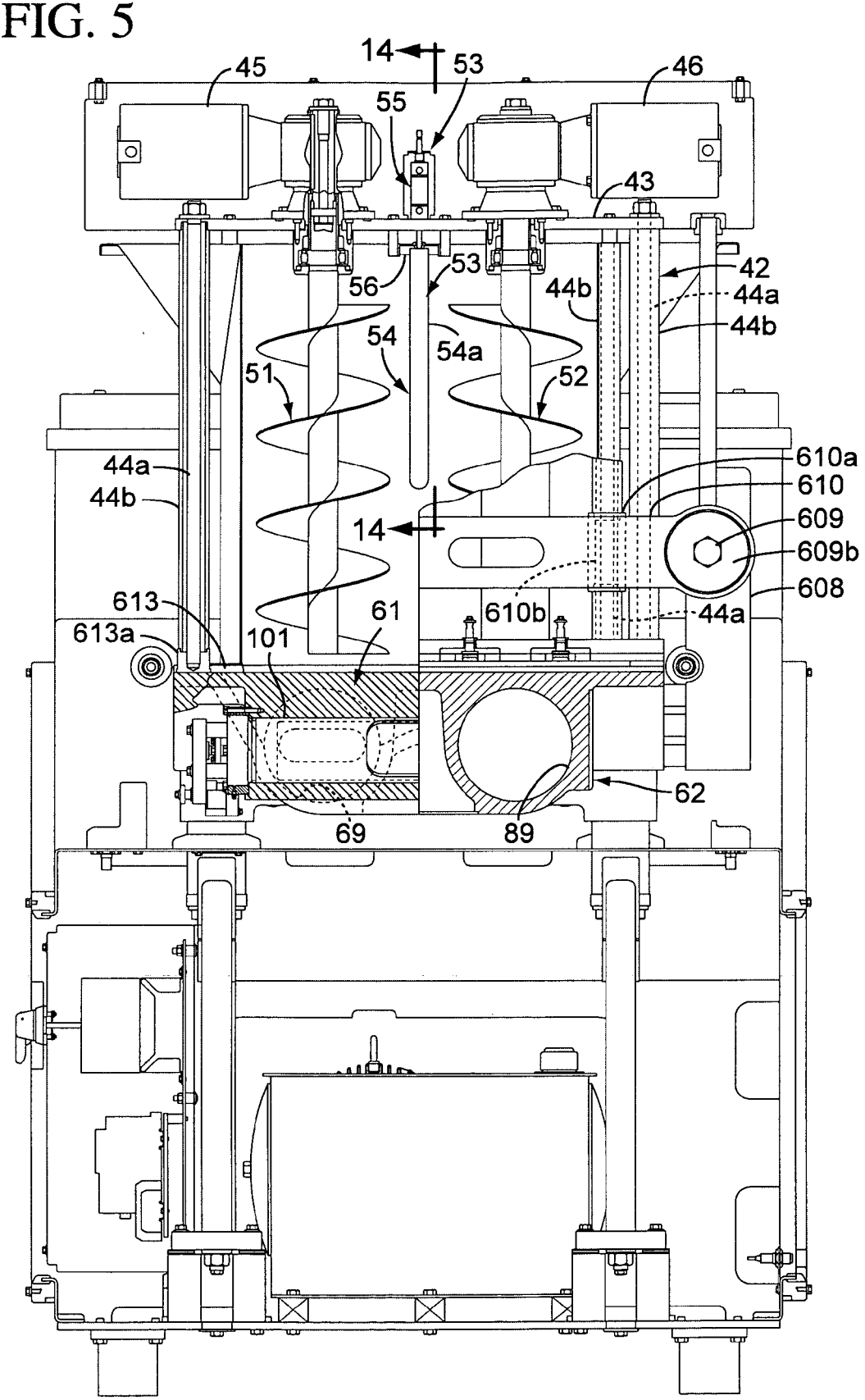
FIG. 5 is a sectional view taken generally along line 5—5 of FIG. 2, with some components and/or panels removed for clarity.

As shown in FIG. 5, the vertical pump 38 comprises two feed screw motors 45, 46 that drive feed screws 51, 52. The two electrical feed screw motors 45, 46 are mounted on support plate 43, within the motor housing. Motor 45 drives the feed screw 51 that extends partly through opening 39 in alignment with a pump plunger 66 of the pump 61. Motor 46 drives the feed screw 52 located at the opposite side of hopper 25 from feed screw 51, and aligned with another pump plunger 68 of the pump 62.

A level sensing mechanism 53 is located at the outlet end of hopper 25. The mechanism is shown in detail in FIG. 14. The mechanism 53 comprises an elongated sensing element 54. As the moldable food material is moved forwardly in the hopper 25, it may accumulate to a level in which it engages and moves the sensing element 54 to a pre-selected degree. When this occurs, a signal is generated to stop the drive for the roller 36 of conveyor 31. In this manner the accumulation of food material at the forward end 25a of hopper 25 is maintained at an advantageous level.

The element 54 includes a food engaging leg 54a, and a bent-off leg 54b. The bent off leg 54b includes a welded-on axle 54c that is journaled for pivoting on each end by bushings held by two lugs 54d. An air cylinder 55 is arranged on the support plate 43. The air cylinder 55 exerts a pre-selected force on the upper leg 54b to oppose rotation of the entire element 54 caused by pressure from food product in the hopper. The cylinder 55 is remotely adjustable to change the force to compensate for variable food material density or to change the level desired at the feed screws 51, 52.

A proximity sensor assembly 56 is arranged next to the cylinder 55 on the support plate 43. A bracket 56a guides a moving shaft 56b. A proximity sensor 56c is mounted to the bracket 56a. The shaft 56b includes a metal target 56d that is sensed by the proximity sensor 56c. The shaft 56b extends through a bushing 43 held on the support plate 43. A lower end of the shaft 56b makes contact with a head of an adjustment screw 54e threaded into the bent off leg 54b. A spring 56e surrounds an upper portion of the shaft 56b and abuts a horizontal portion 56f of the bracket 56a. The spring thus urges the shaft into contact with the adjustment screw 54e. The bent off leg 54b includes an up turned end 54f that contacts the motor housing when the element 54 is rotated counterclockwise (FIG. 14) to a maximum amount by the cylinder 55 corresponding to low or no level of food product to the right of the portion 54a as seen in FIG. 14, or to left of the portion 54a as seen in FIG. 2.

Figure 14:
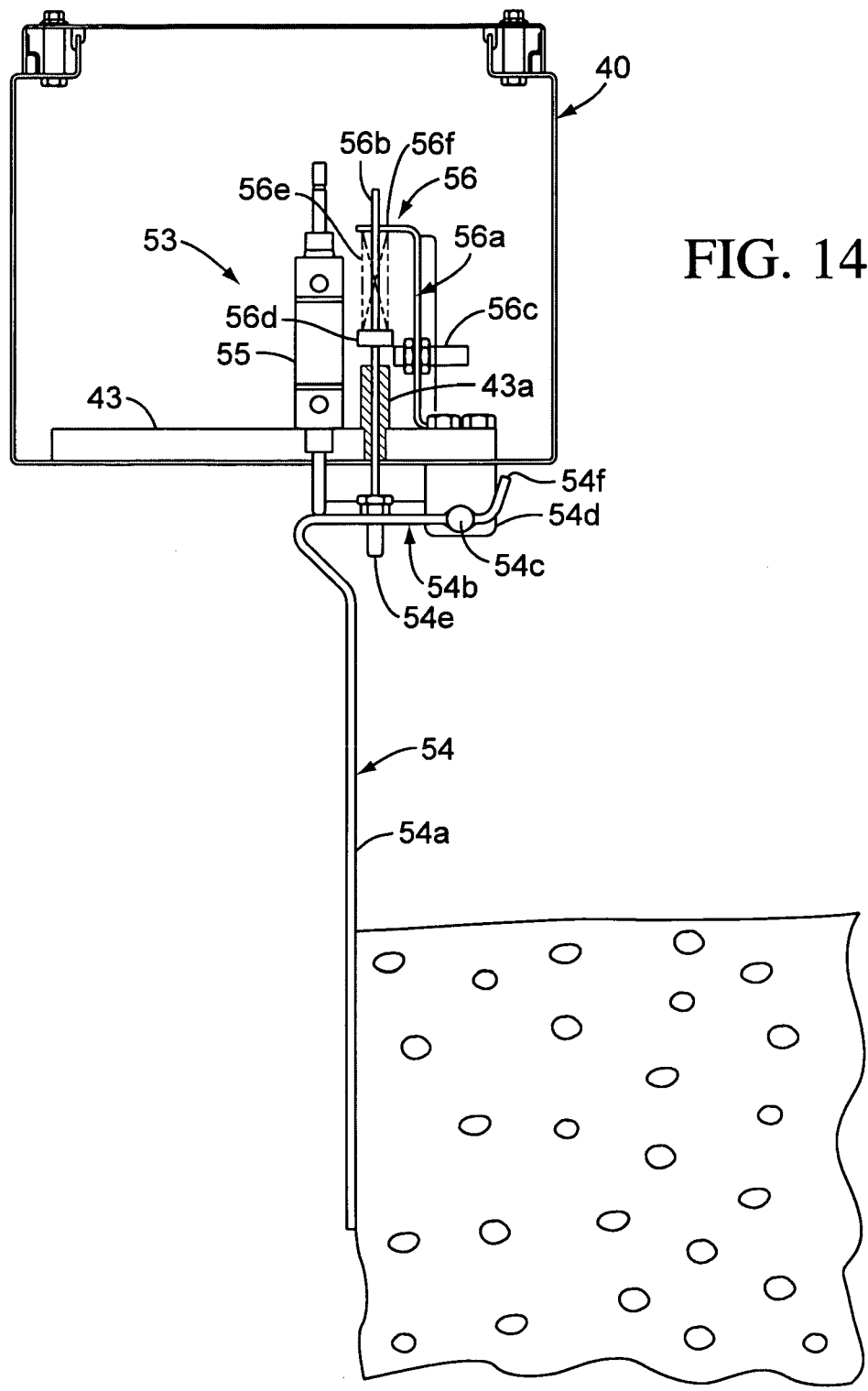
FIG. 14 is an enlarged fragmentary sectional view taken generally along line 14—14 of FIG. 5, with some components and/or panels removed for clarity.

FIG. 14 shows the element 54 rotated to a maximum extent clockwise subject to a high level of food product in the forward end 25a of the hopper 25. The proximity target 56d has passed the sensor 56c to trigger a signal to the machine control 23 to turn off the conveyor 30.

Figure 2:
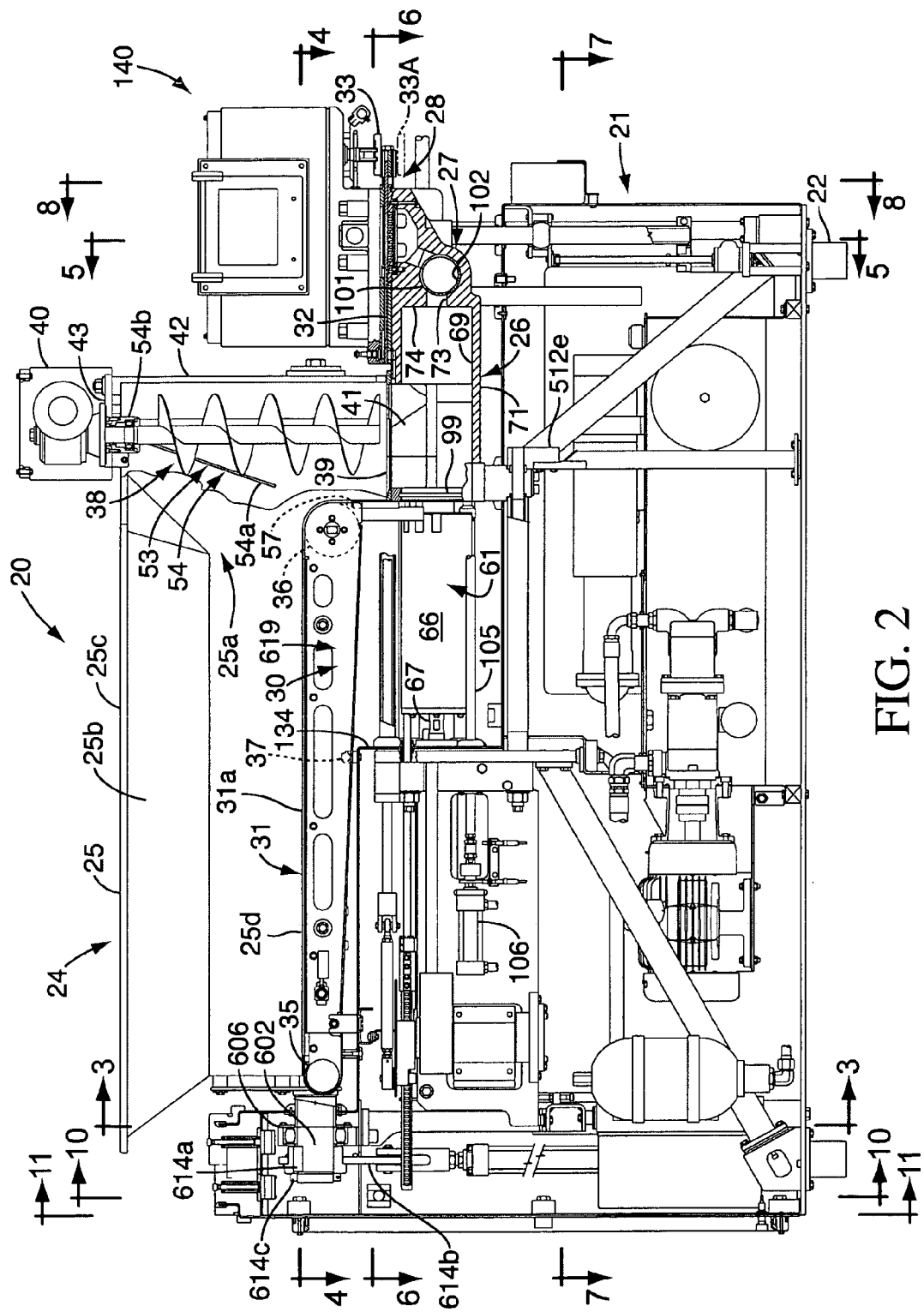
FIG. 2 is a longitudinal sectional view of the patty-forming machine of FIG. 1, with some components and/or panels removed for clarity.

When machine 20 is in operation, the feed screw motor 45 is energized whenever plunger 66 is withdrawn to the position shown in FIG. 2, so that feed screw 51 supplies meat from hopper 25 downwardly through outlet 39 into one side of the intake 41 of the food pumping system 26. Similarly, motor 46 actuates the feed screws 52 to feed meat to the other side of intake 41 whenever plunger 68 of the pump 62 is withdrawn. In each instance, the feed screw motors 45, 46 are timed to shut off shortly after the plunger is fully retracted, avoiding excessive agitation of the meat. As the supply of food material in the outlet 39 is depleted, the conveyor belt 31 continuously moves food forwardly in the hopper and into position to be engaged by the feed screws 51, 52. If the level of meat at the outlet 39 becomes excessive, conveyor 30 is stopped, as described above, until the supply at the hopper outlet is again depleted.

The wall of the outlet 39 immediately below conveyor drive roller 36 comprises a belt wiper plate 57 that continuously engages the surface of the conveyor 31 to prevent leakage of the food material 38 from the hopper at this point.

Food Pump System

Figure 6:
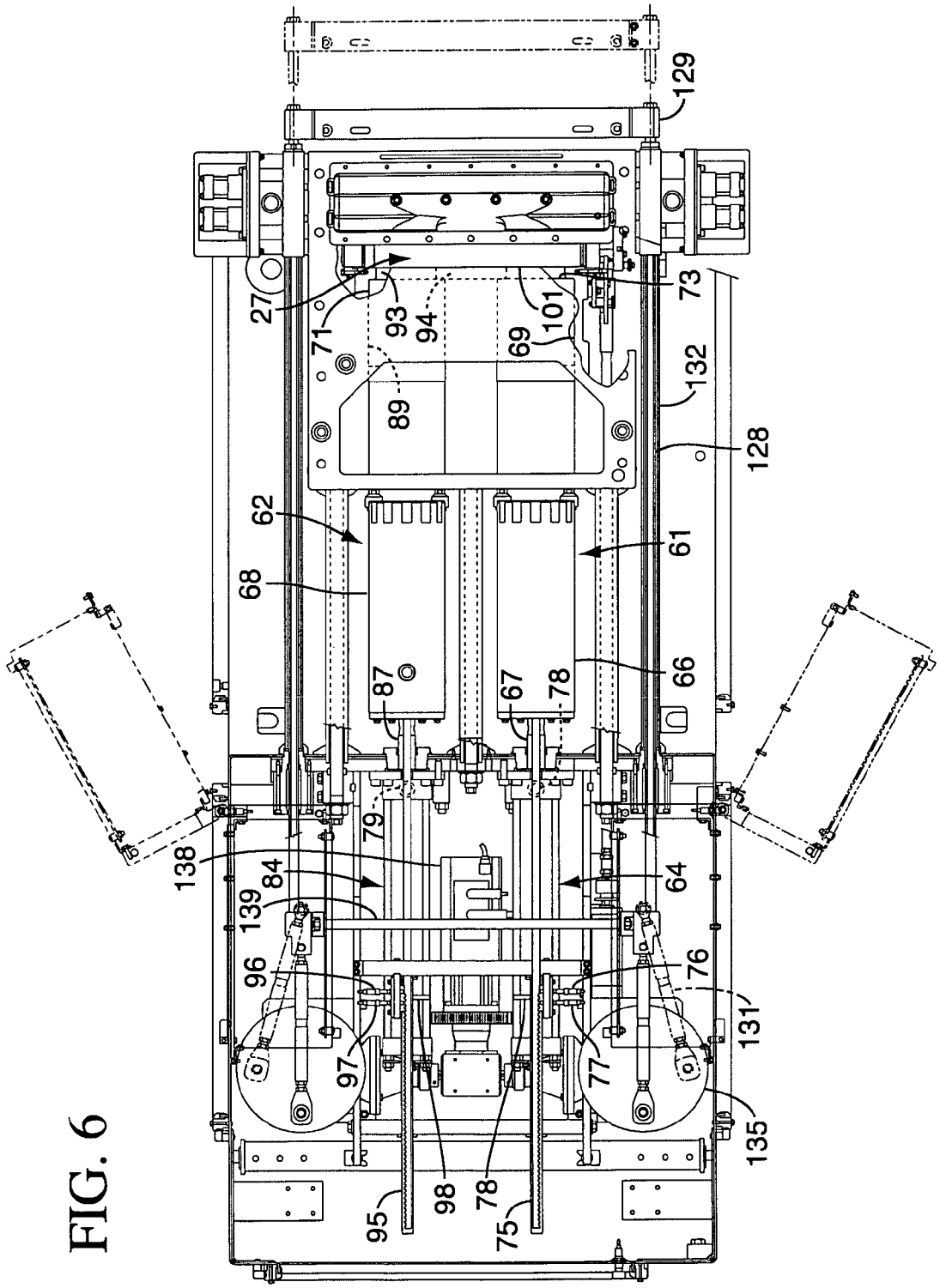
FIG. 6 is a sectional view taken generally along line 6—6 of FIG. 2, with some components and/or panels removed for clarity.
Figure 7:
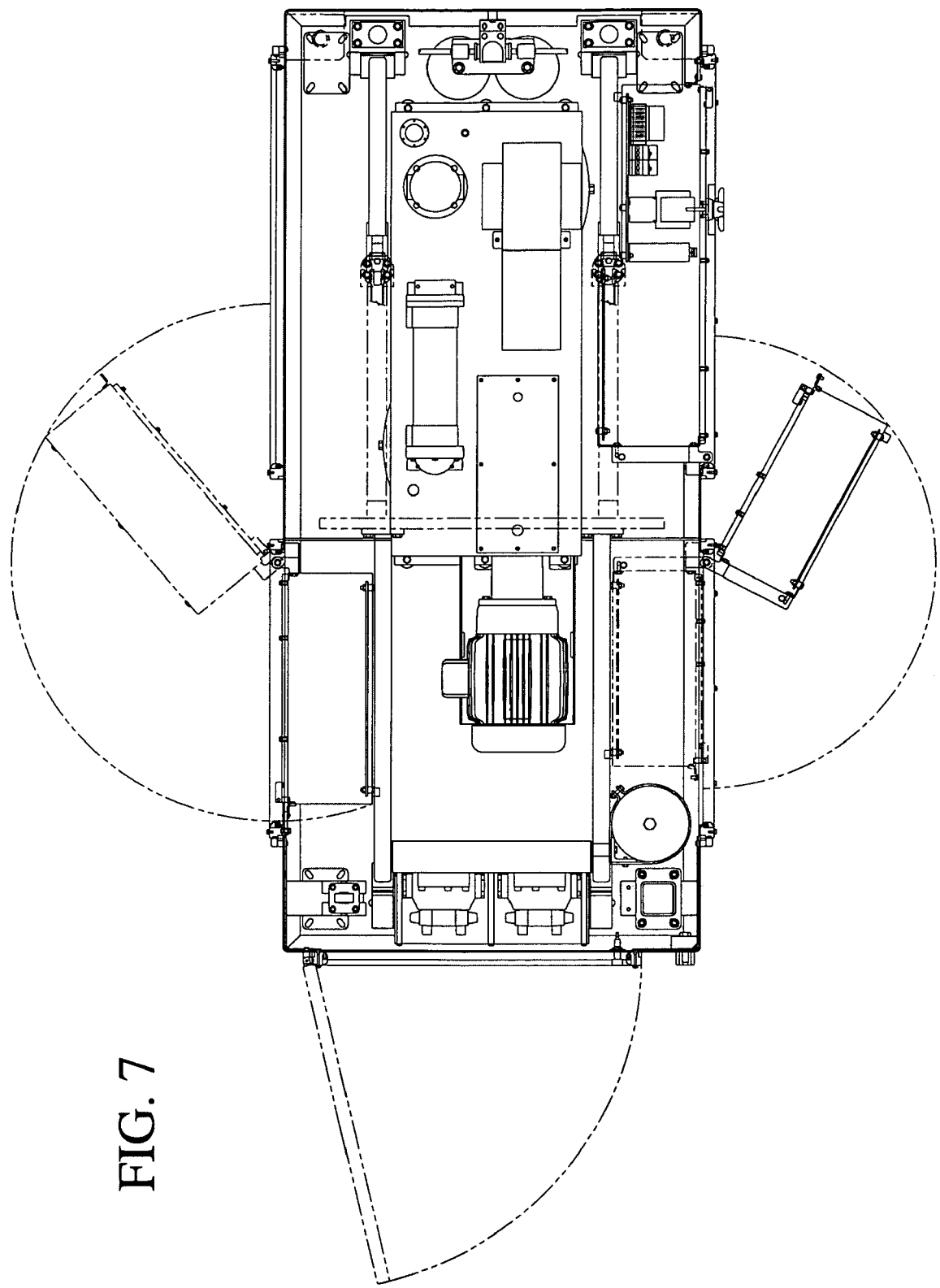
FIG. 7 is a sectional view taken generally along line 7—7 of FIG. 2, with some components and/or panels removed for clarity.
Figure 8:
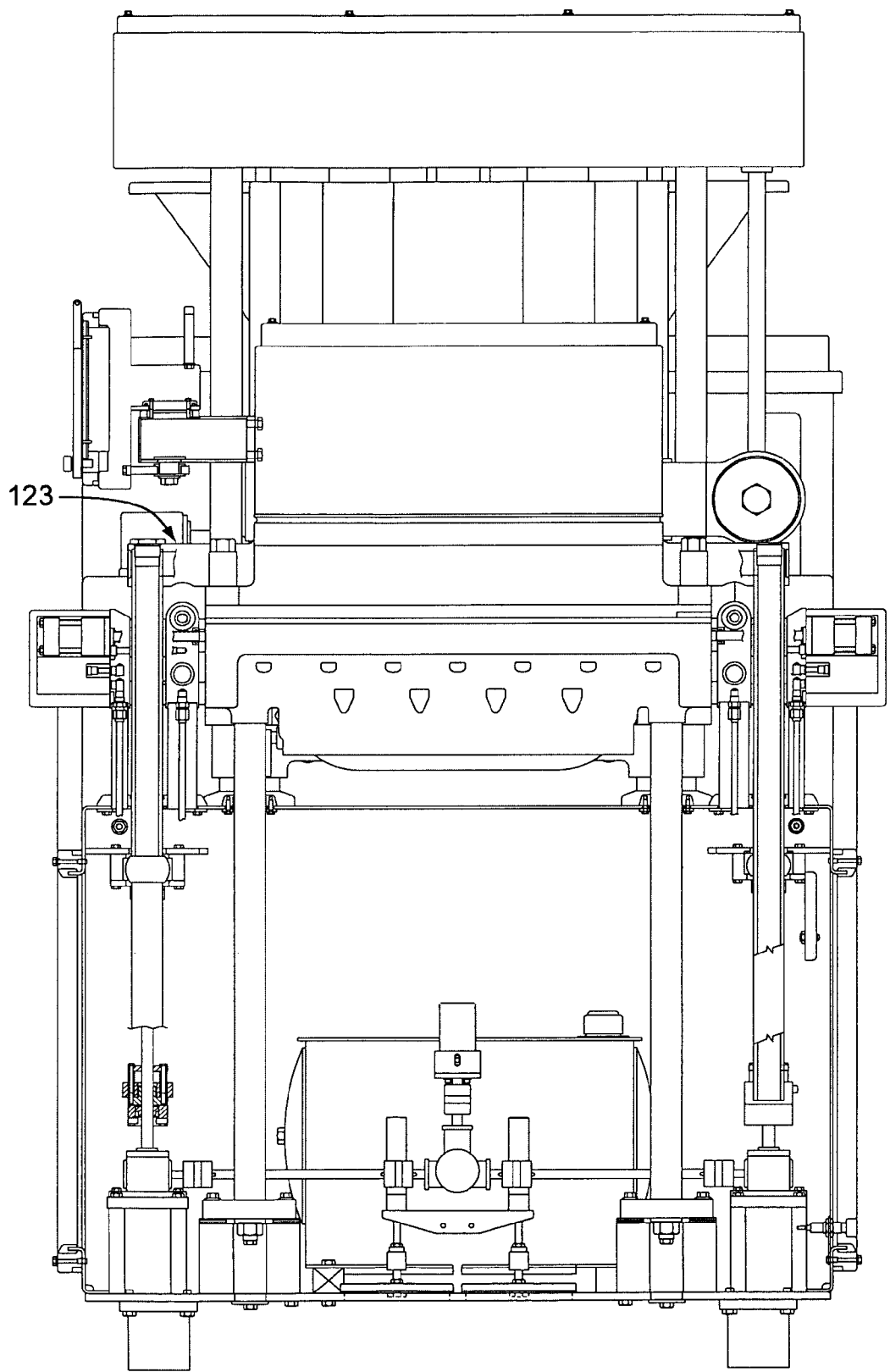
FIG. 8 is a sectional view taken generally along line 8—8 of FIG. 2, with some components and/or panels removed for clarity.

The food pump system 26 of molding machine 20 is best illustrated in FIGS. 2 and 6. Pump system 26 comprises the two reciprocating food pumps 61, 62 mounted on the machine base 21. The first food pump 61 includes a hydraulic cylinder 64. The piston in cylinder 64 (not shown) is connected to an elongated piston rod 67; the outer end of the elongated piston rod 67 is connected to the large plunger 66. The plunger 66 is aligned with a first pump cavity 69 formed by a pump cavity enclosure or housing 71 that is divided into two pump chambers. The forward wall 74 of pump cavity 69 has a relatively narrow slot 73 that communicates with the pump manifold 27 as described more fully hereinafter.

Preferably, the pump housing 71 and the valve manifold 27 are cast or otherwise formed as a one piece stainless steel part.

The second food pump 62 is essentially similar in construction to pump 61 and comprises a hydraulic cylinder 84. Cylinder 84 has an elongated piston rod 87 connected to the large plunger 68 that is aligned with a second pump cavity 89 in housing 71. The forward wall 94 of pump cavity 89 includes a narrow elongated slot 93 communicating with manifold 27.

Advantageously, the plungers 66, 68 and the pump cavities 69, 89 have corresponding round cross sections for ease of manufacturing and cleaning.

An elongated proximity meter 75 is affixed to the first pump plunger 66 and extends parallel to piston rod 67 into alignment with a pair of proximity sensors 76 and 77. A similar proximity meter 95 is fixed to and projects from plunger 68, parallel to piston rod 87, in alignment with a pair of proximity sensors 96, 97. Proximity sensors 76, 77 and 96, 97 comprise a part of the control of the two pumps 61, 62.

The meters 75, 95 and sensors 76, 77, 96, 97 monitor the plunger positions in small, precise increments, such as every 0.25 inches. The meters include teeth or other targets that are sensed by the sensors and counted by machine electronics, such as in the controller 23, or in intervening electronics and communicated to the controller 23.

Two further proximity sensors 78, 98 responsive to targets on an inside facing surfaces of the meters 75, 95 respectively, are provided which communicate to the controller 23, or to intervening electronics that communicate with the controller 23, the home position of the respective plunger which corresponds to a front end of each plunger being just inside, and sealed by a front ring seal 99 (FIG. 2) to the pump housing 71. The home position of each plunger is used by the controller to calibrate or set the machine position control of the plungers 66, 86.

In operation, the first pump 61 pumps the moldable food material into manifold 27 and the second pump 62 receives a supply of the moldable food material for a subsequent pumping operation. Pump 61 begins its pumping stroke, and compresses food product in pump cavity 69, forcing the moldable food material through slot 73 into manifold 27. As operation of molding machine 20 continues, pump 61 advances plunger 66 to compensate for the removal of food material through manifold 27. The pump can maintain a constant pressure on the food material in the chamber 69 during the molding cycle, or preferably can provide a pre-selected pressure profile over the molding cycle such as described in U.S. Pat. No. 4,356,595, incorporated herein by reference, or as utilized in currently available FORMAX machines. The pressure applied through pump 61 is sensed by a pressure sensing switch 78 connected to a port of the cylinder 64.

As plunger 66 advances, the corresponding movement of proximity meter 75 signals the sensor 76, indicating that plunger 66 is near the end of its permitted range of travel. When this occurs, pump 62 is actuated to advance plunger 68 through pump cavity 89, compressing the food material in the second pump cavity in preparation for feeding the food material from the cavity into manifold 27. The pressure applied through pump 62 is sensed by a pressure sensing switch 79 connected to one port of cylinder 84.

When the food in the second pump cavity 89 is under adequate pressure, the input to manifold 27 is modified so that subsequent feeding of food product to the manifold is effected from the second pump cavity 89 with continuing advancement of plunger 68 of the second pump 62. After the manifold intake has been changed over, pump 61 is actuated to withdraw plunger 66 from cavity 69.

Thereafter, when plunger 68 is near the end of its pressure stroke into pump cavity 89, proximity sensor 96, signals the need to transfer pumping operations to pump 61. The changeover process described immediately above is reversed; pump 61 begins its compression stroke, manifold 27 is changed over for intake from pump 61, and pump 62 subsequently retracts plunger 68 back to the supply position to allow a refill of pump cavity 89. This overlapping alternating operation of the two pumps 61, 62 continues as long as molding machine 20 is in operation.

The valve manifold 27, shown in FIGS. 2 and 6, holds a manifold valve cylinder or tube valve 101 fit into an opening 102 in housing 71 immediately beyond the pump cavity walls 74 and 94.

According to the illustrated embodiment, valve cylinder 101 includes two longitudinally displaced intake slots 107 and 108 alignable with the outlet slots 73 and 93, respectively, in the pump cavity walls 74 and 94. Slots 107 and 108 are angularly displaced from each other to preclude simultaneous communication between the manifold and both pump cavities 69 and 89. Cylinder 101 also includes an elongated outlet slot 109. The valve cylinder outlet slot 109 is generally aligned with a slot 111 (see FIG. 9A) in housing 71 that constitutes a feed passage for molding mechanism 28.

One end wall of valve cylinder 101 includes an externally projecting base end 103 that is connected to a drive linkage 104, in turn connected to the end of the piston rod 105 of a hydraulic actuator cylinder 106 (FIG. 2).

When the pump 61 is supplying food material under pressure to molding mechanism 28, actuator cylinder 106 has retracted piston rod 105 to the inner limit of its travel, angularly orienting the manifold valve cylinder 101. With cylinder 101 in this position, its intake slot 107 is aligned with the outlet slot 73 from pump cavity 69 so that food material is forced under pressure from cavity 69 through the interior of valve cylinder 101 and out of the valve cylinder outlet slot 109 through slot 111 to the molding mechanism 27. On the other hand, the second intake slot 108 of valve cylinder 101 is displaced from the outlet slot 93 for the second pump cavity 89. Consequently, the food material forced into the interior of valve cylinder 101 from pump cavity 69 cannot flow back into the other pump cavity 89.

The valve cylinder 101 and corresponding slots or openings can alternately be as described in U.S. Provisional Application 60/571,368, filed May 14, 2004, or U.S. Ser. No. 10/942754, filed on the same day as the present invention and identified by attorney docket number 2188P0381 US, both herein incorporated by reference. According to these disclosures, rather than a single outlet 109, two rows of progressively sized outlets, smallest closest to the active pump, are alternately opened to plural openings that replace the single opening 111.

Molding Mechanism

Figure 9A:
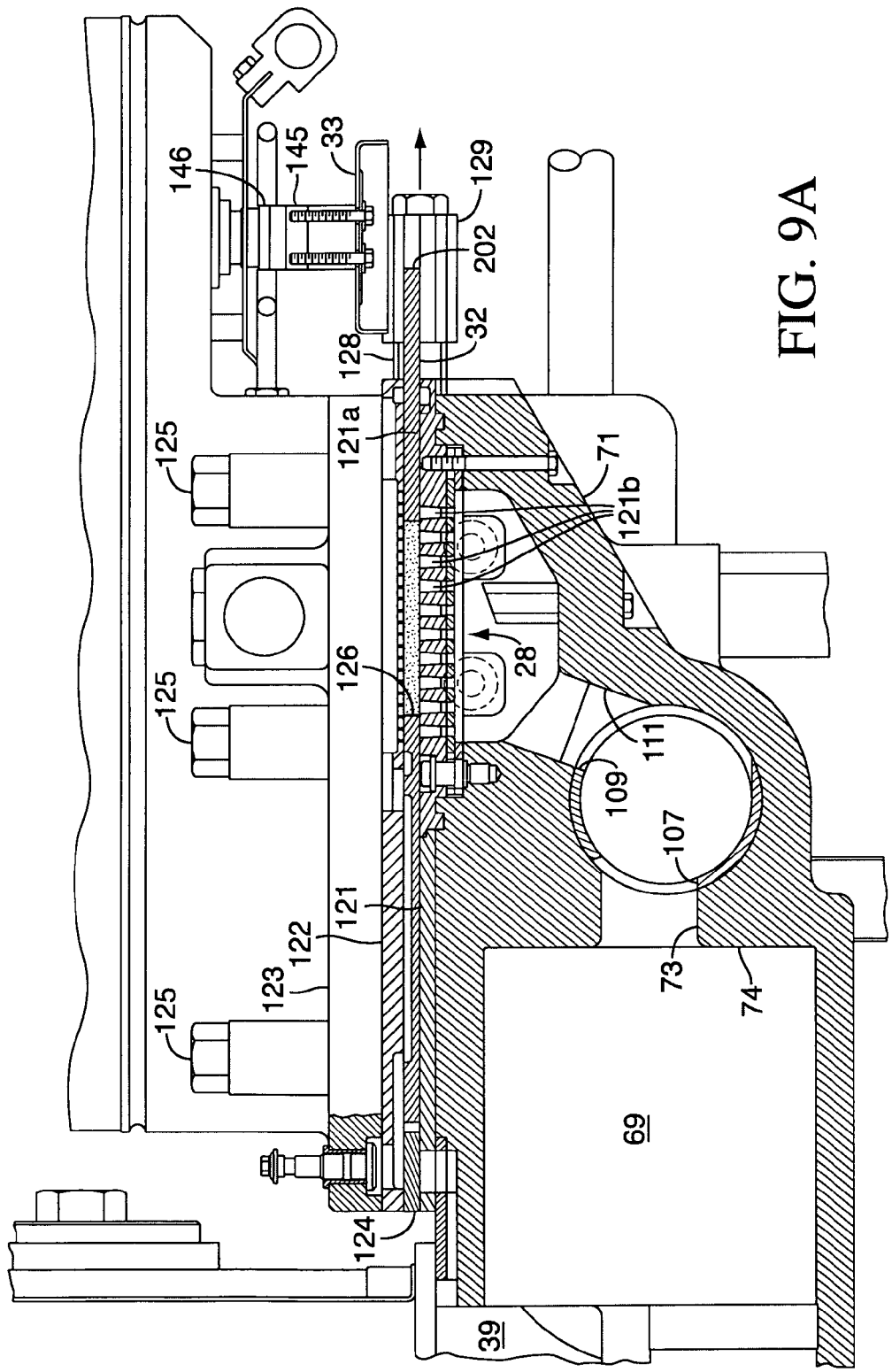
FIG. 9A is an enlarged fragmentary sectional views taken from FIG. 2, showing the machine configuration with the mold plate in a cavity fill position.

As best illustrated in FIG. 9A, the upper surface of the housing 71 that encloses the pump cavities 69 and 89 and the manifold 27 carries a support plate or wear plate 121 and a fill plate 121a that forms a flat, smooth mold plate support surface. The mold support plate 121 and the fill plate 121a may be fabricated as two plates as shown or a single plate bolted to or otherwise fixedly mounted upon housing 71. The fill plate 121a includes apertures or slots 121b that form the upper portion of the manifold outlet passage 111. In the apparatus illustrated, a multi fill orifice type fill plate 121a is utilized. A simple slotted fill plate is also encompassed by the invention.

Mold plate 32 is supported upon plates 121, 121a. Mold plate 32 includes a plurality of individual mold cavities 126 extending across the width of the mold plate and alignable with the manifold outlet passageway 111. Although a single row of cavities is shown, it is also encompassed by the invention to provide plural rows of cavities, stacked in aligned columns or in staggered columns. A cover plate 122 is disposed immediately above mold plate 32, closing off the top of each of the mold cavities 126. A mold cover casting or housing 123 is mounted upon cover plate 122. The spacing between cover plate 122 and support plate 121 is maintained equal to the thickness of mold plate 32 by support spacers 124 mounted upon support plate 121. Cover plate 122 rests upon spacers 124 when the molding mechanism is assembled for operation. Cover plate 122 and mold cover casting 123 are held in place by six mounting bolts, or nuts tightened on studs, 125.

A mold plate drive system is described in U.S. Ser. No. 10/943805, and filed on the same day as the present application, and herein incorporated by reference.

Figure 3:
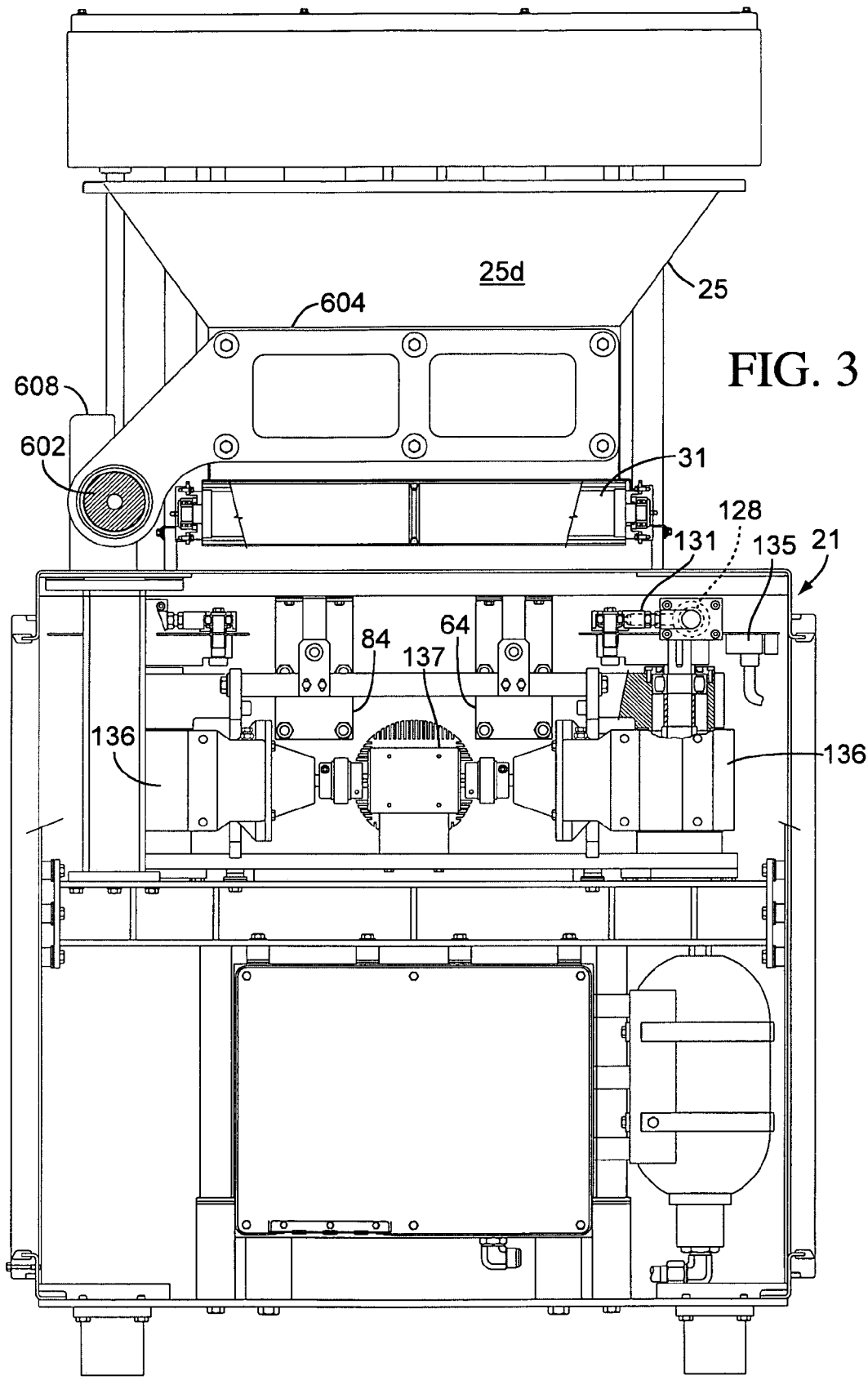
FIG. 3 is a sectional view taken generally along line 3—3 of FIG. 2, with some components and/or panels removed for clarity.
Figure 12:
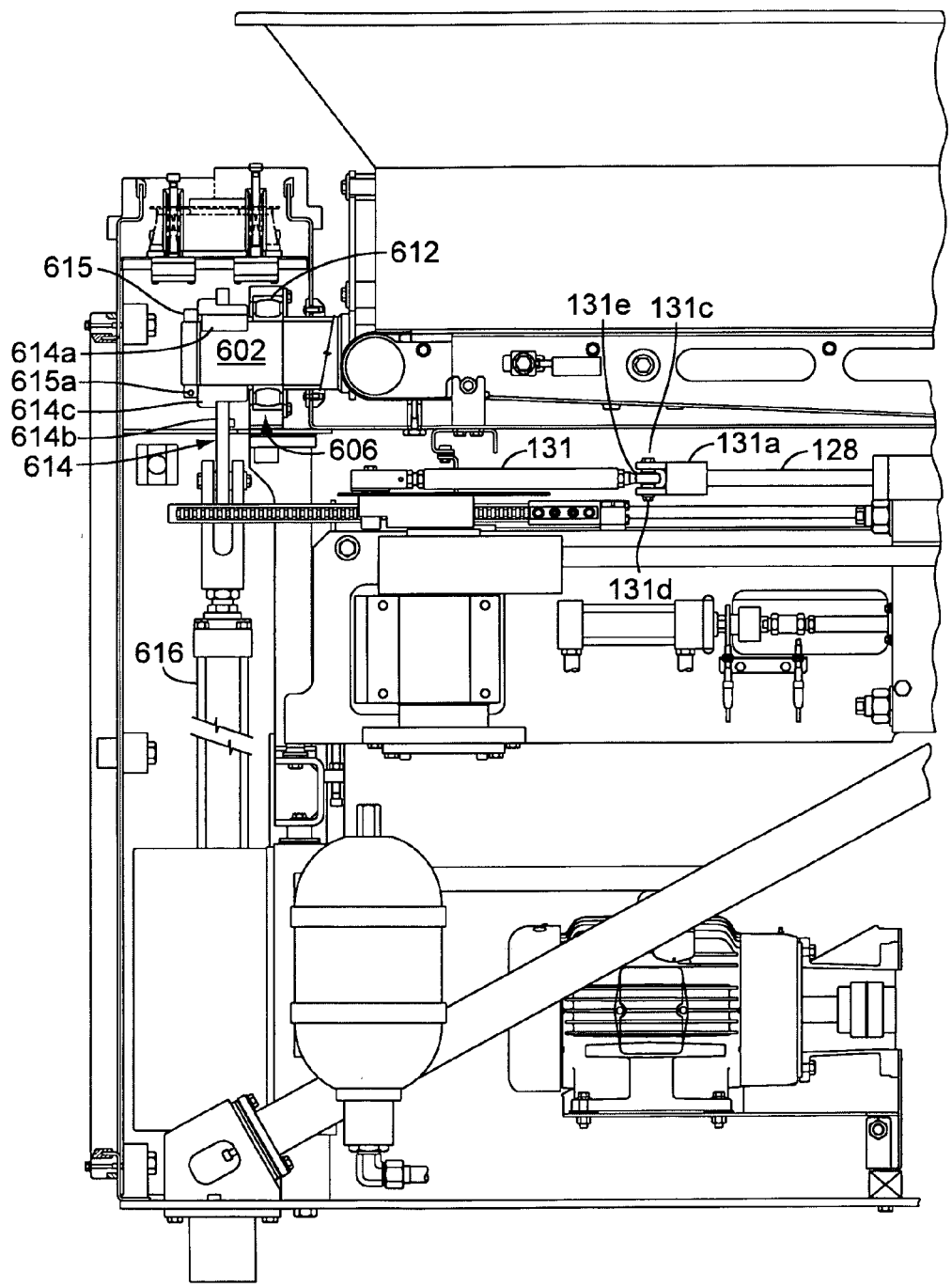
FIG. 12 is an enlarged, fragmentary view taken from the left side of FIG. 2.

As best illustrated in FIGS. 3 and 6 mold plate 32 is connected to drive rods 128 that extend alongside housing 71 and are connected at one end to a transverse bar 129. The other end of each drive rod 128 is pivotally connected to a connecting link 131 via a coupling plate 131a and a pivot connection 131c, shown in FIG. 12. The pivot connection 131c can include a bearing (not visible in the figures) surrounding a pin 131d within an apertured end 131e of the connecting link 131. The pin 131d includes a cap, or carries a threaded nut, on each opposite end to secure the crank arm to the coupling plate 131a.

Each drive rod 128 is carried within a guide tube 132 that is fixed between a wall 134 and a front bearing housing 133. The connecting links 131 are each pivotally connected to a crank arm 142 via a pin 141 that is journaled by a bearing 141a that is fit within an end portion of the connecting link 131. The pin crank arm 142 is fixed to, and rotates with, a circular guard plate 135. The pin 141 has a cap, or carries a threaded nut, on each opposite end that axially fixes the connecting link 131 to the crank arm 142 and the circular guard plate 135. The connecting link 131 also includes a threaded portion 131b to finely adjust the connecting link length.

The crank arms 142 are each driven by a right angle gear box 136 via a "T" gear box 137 having one input that is driven by a precise position controlled motor 138 and two outputs to the gearboxes 136. The "T" gear box 137 and the right angle gear boxes 136 are configured such that the crank arms 142 rotate in opposite directions at the same rotary speed.

The precise position controlled motor can be a 6–7.5 HP totally enclosed fan cooled servo motor. The servo motor is provided with two modules: a power amplifier that drives the servo motor, and a servo controller that communicates precise position information to the machine controller 23.

The controller 23 and the servo motor 138 are preferably configured such that the servo motor rotates in an opposite rotary direction every cycle, i.e., clockwise during one cycle, counterclockwise the next cycle, clockwise the next cycle, etc.

A bearing housing 143 is supported on each gearbox 136 and includes a rotary bearing 143a therein to journal an output shaft 136a of the gear box 136. The output shaft 136a is fixed to the crank arm 142 by a clamp arrangement formed by legs of the crank arm 142 that surround the output shaft and have fasteners that draw the legs together to clamp the output shaft between the legs (not shown), and a longitudinal key (not shown) fit into a keyway 136b on the output shaft and a corresponding keyway in the crank arm 142 (not shown).

A tie bar 139 is connected between the rods 128 to ensure a parallel reciprocation of the rods 128. As the crank arms 142 rotate in opposite rotational directions, the outward centrifugal force caused by the rotation of the crank arms 142 and the eccentric weight of the attached links 131 cancels, and separation force is taken up by tension in the tie bar 139.

One circular guard plate 135 is fastened on top of each crank arm 142. The pin 141 can act as a shear pin. If the mold plate should strike a hard obstruction, the shear pin can shear by force of the crank arm 142. The guard plate 135 prevents an end of the link 131 from dropping into the path of the crank arm 142.

During a molding operation, the molding mechanism 28 is assembled as shown in FIGS. 2 and 9A, with cover plate 122 tightly clamped onto spacers 124.

The knockout cups 33 are driven by a knockout drive mechanism as described in U.S. Ser. No. 10/943809, filed on the same day as the present application, and herein incorporated by reference.

Figure 9B:
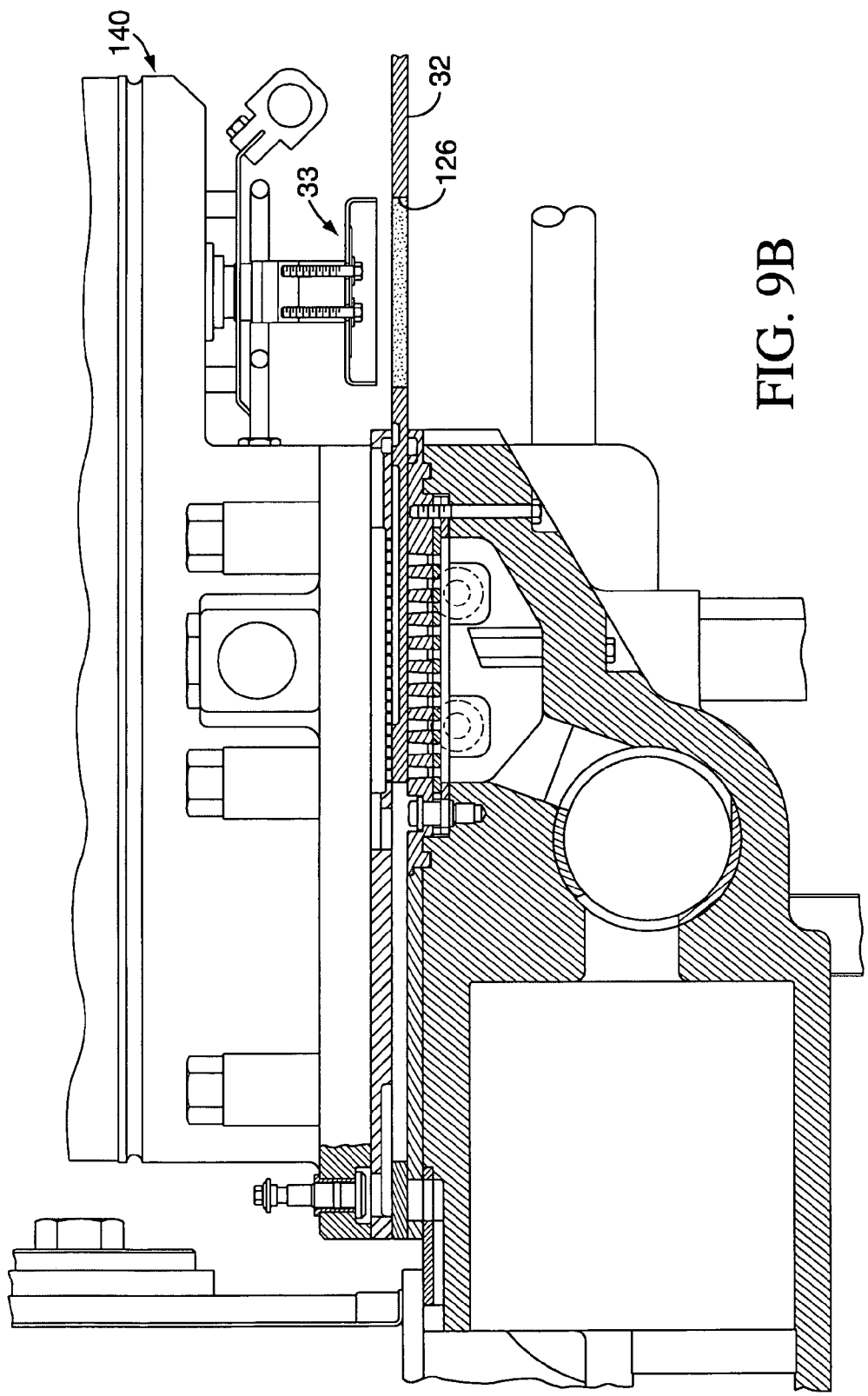
FIG. 9B is an enlarged fragmentary sectional views taken from FIG. 2, showing the machine configuration with the mold plate in a patty discharge position.

In each cycle of operation, knockout cups 33 are first withdrawn to the elevated position as shown in FIG. 9B. The drive for mold plate 32 then slides the mold plate from the full extended position to the mold filling position illustrated in FIGS. 2 and 9A, with the mold cavities 126 aligned with fill apertures 121b.

During most of each cycle of operation of mold plate 32, the knockout mechanism remains in the elevated position, shown in FIG. 9B, with knockout cups 33 clear of mold plate 32. When mold plate 32 reaches its extended discharge position as shown in FIG. 9B, the knockout cups 33 are driven downward to discharge the patties from the mold cavities.

The discharged patties may be picked up by the conveyor 29 or may be accumulated in a stacker. If desired, the discharged patties may be interleaved with paper, by an appropriate paper interleaving device. Such a device is disclosed in U.S. Pat. No. 3,952,478, or U.S. Ser. No. 60/540,022, filed on Jan. 27, 2004, both incorporated herein by reference. In fact, machine 20 may be used with a wide variety of secondary equipment, including steak folders, bird rollers, and other such equipment.

Hopper System

The hopper 25 can be constructed as a unitary, one piece part (FIG. 13), comprised of a 0.09 inch thick welded and polished stainless steel part. A one piece hopper is advantageous to reduce leakage.

As shown in FIG. 3, the hopper 25 is supported at a rear by a hinge shaft 602 via a rear bracket 604 that is fastened to a rear wall 25d of the hopper 25. The bracket 604 is fixed to the hinge shaft 602 to rotate therewith. The fixing can be by a press fit engagement, a keyed arrangement between the bracket and the shaft, or by the bracket being fastened to the shaft with fasteners, or by another known non-rotation fixation method.

As shown in FIGS. 4, 5, 10, and 12 the hinge shaft 602 is supported from the machine base 21 and journaled for rotation by a rear support 606 (FIGS. 10 and 12) and by a front support 608 (FIG. 5). The rear support 606 includes a roller bearing 612 that surrounds the hinge shaft 602 and provides for a reduced-friction rotation of the hinge shaft. The front support 608 comprises a sleeve bearing that provides for a reduced-friction rotation of the hinge shaft.

Figure 13:
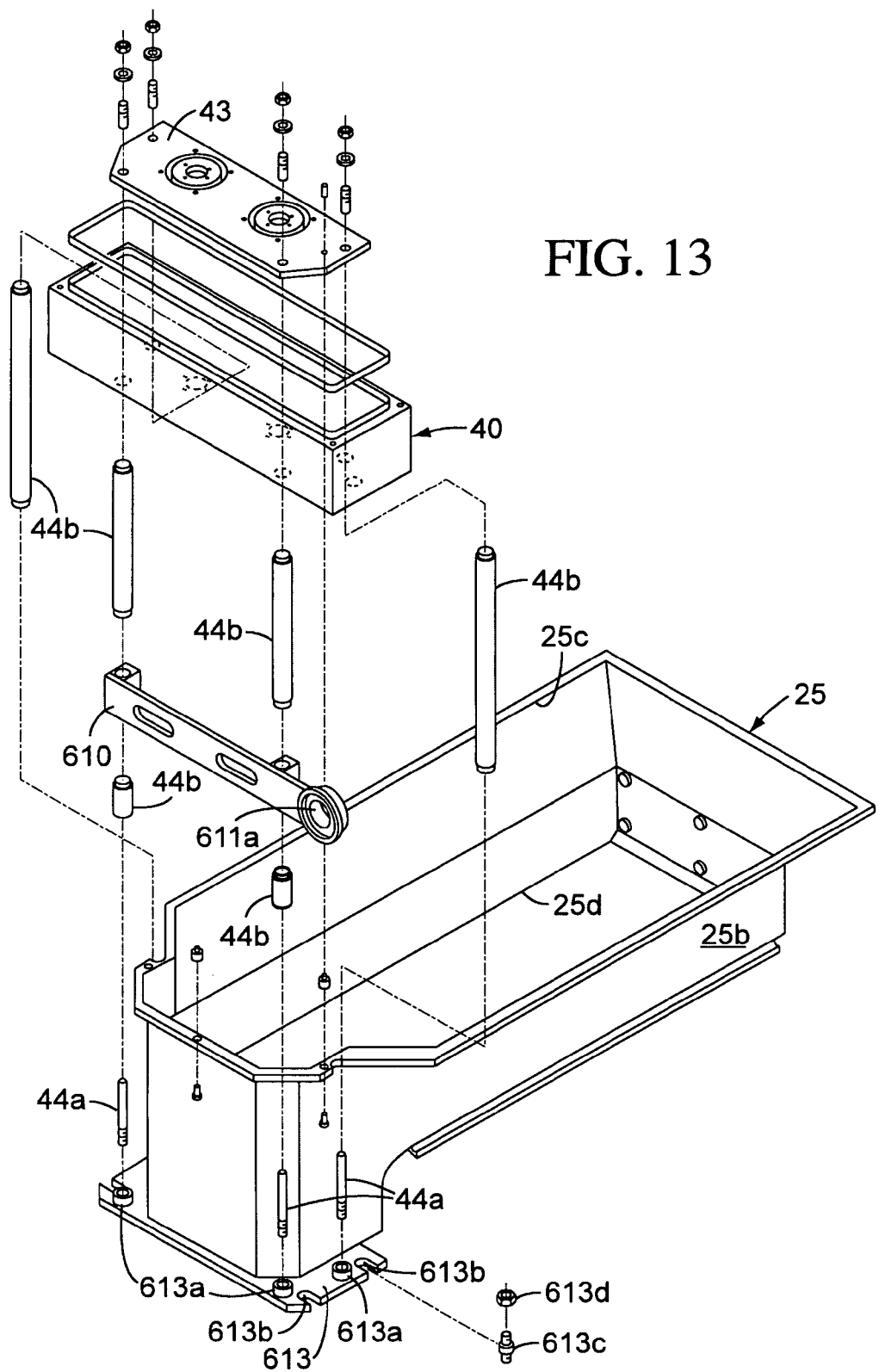
FIG. 13 is an exploded perspective view of a hopper and some attached components of the patty-forming machine.

As shown in FIGS. 5 and 13, the hopper 25 and feed screw frame 42 are fixed to the shaft 602 by a bracket 610 that includes two bosses 610a each with a bore 610b. The bracket 610 is fixed to rotate with the shaft 602 by use of a non-circular, hexagonal opening 611a in the bracket 610 (See FIG. 13) that fits tightly over a correspondingly shaped end protrusion 611b (FIG. 4) of the shaft 602. The bracket is then tightly clamped to the shaft by a bolt 609 and a washer 609b (FIGS. 4 and 5), the bolt 609 engaged into a threaded bore in the protrusion 611b. The bracket 610 is fixed to the frame 42 by the bosses 610a being fit within a gap along the spacers 44b of the front two spacers 44b and the associated tie rods 44a being inserted through the bosses 610a and spacers 44b and then tightened. The tie rods 44a are tightened via threaded inserts 613a to a horizontal plate 613 that forms part of the hopper assembly.

Also shown in FIG. 13, the base plate 613 includes four slots 613b, arranged symmetrically, two on each side of the hopper. Four studs 613c (one shown) are threaded into threaded holes in the pump housing 71, and fit within the slots 613b when the hopper is pivoted down to its operational position. Four nuts 613d secure the base plate 613 and the hopper 25 to the pump housing 71.

Figure 10A:
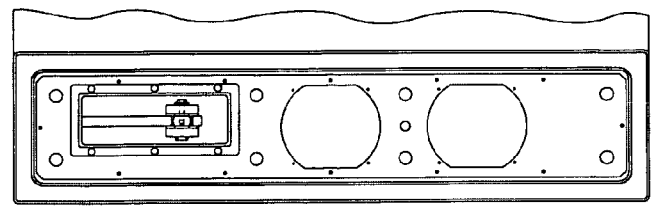
FIG. 10A is a sectional view taken generally along line 10A—10A of FIG. 10.
Figure 10:
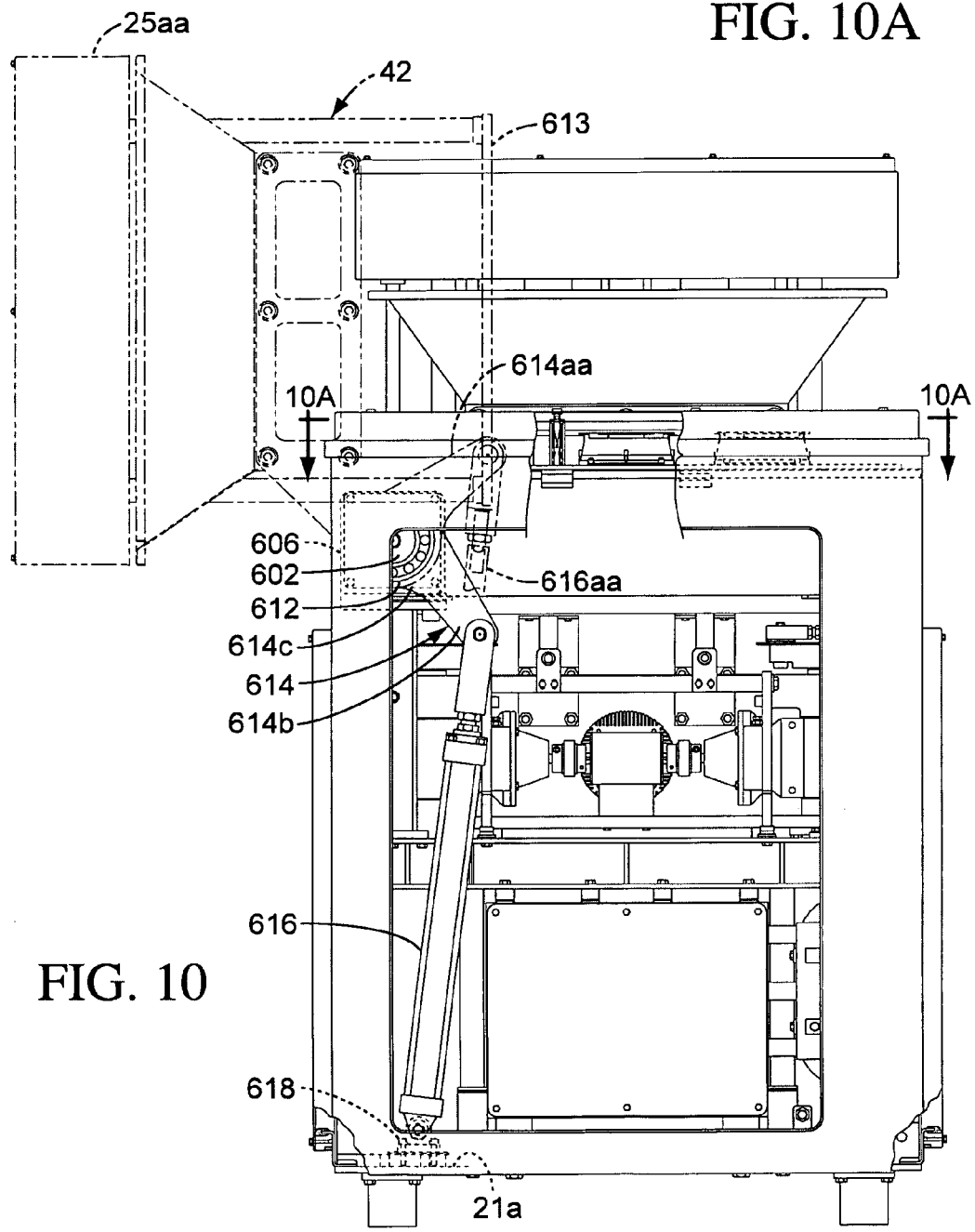
FIG. 10 is a sectional view taken generally along line 10—10 of FIG. 2, with some components and/or panels removed for clarity.
Figure 10D:
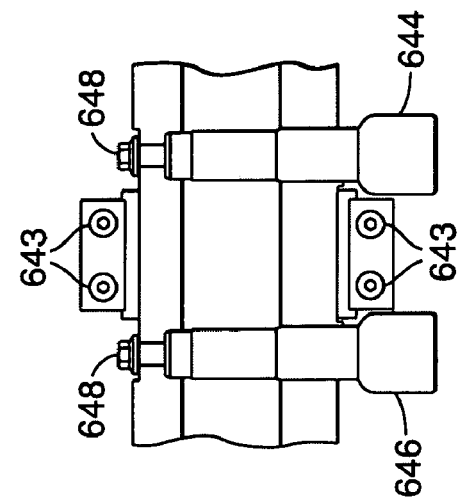
FIG. 10D is a view taken generally along line 10D—10D of FIG. 10C.
Figure 10B:
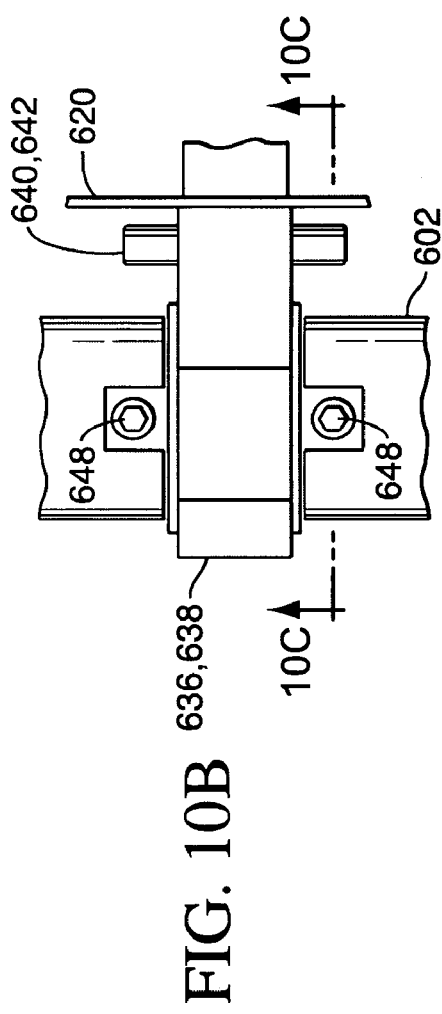
FIG. 10B is an enlarged, fragmentary plan view of pivot fixtures taken from FIG. 4.
Figure 10C:
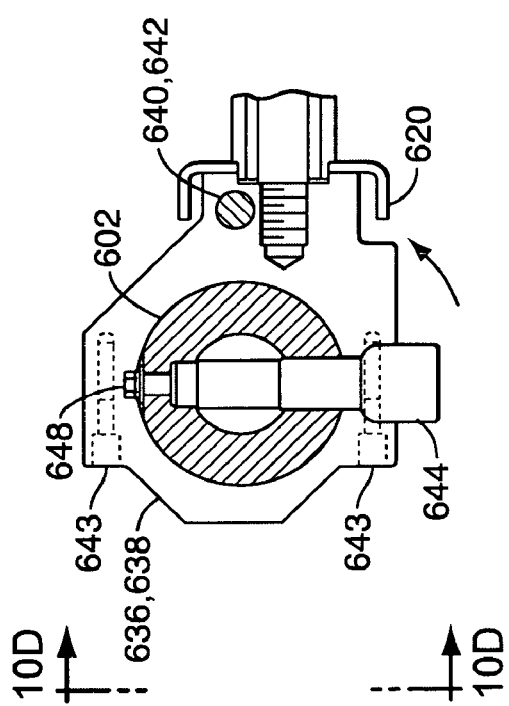
FIG. 10C is a sectional view taken generally along line 10C—10C of FIG. 10B.
Figure 11:
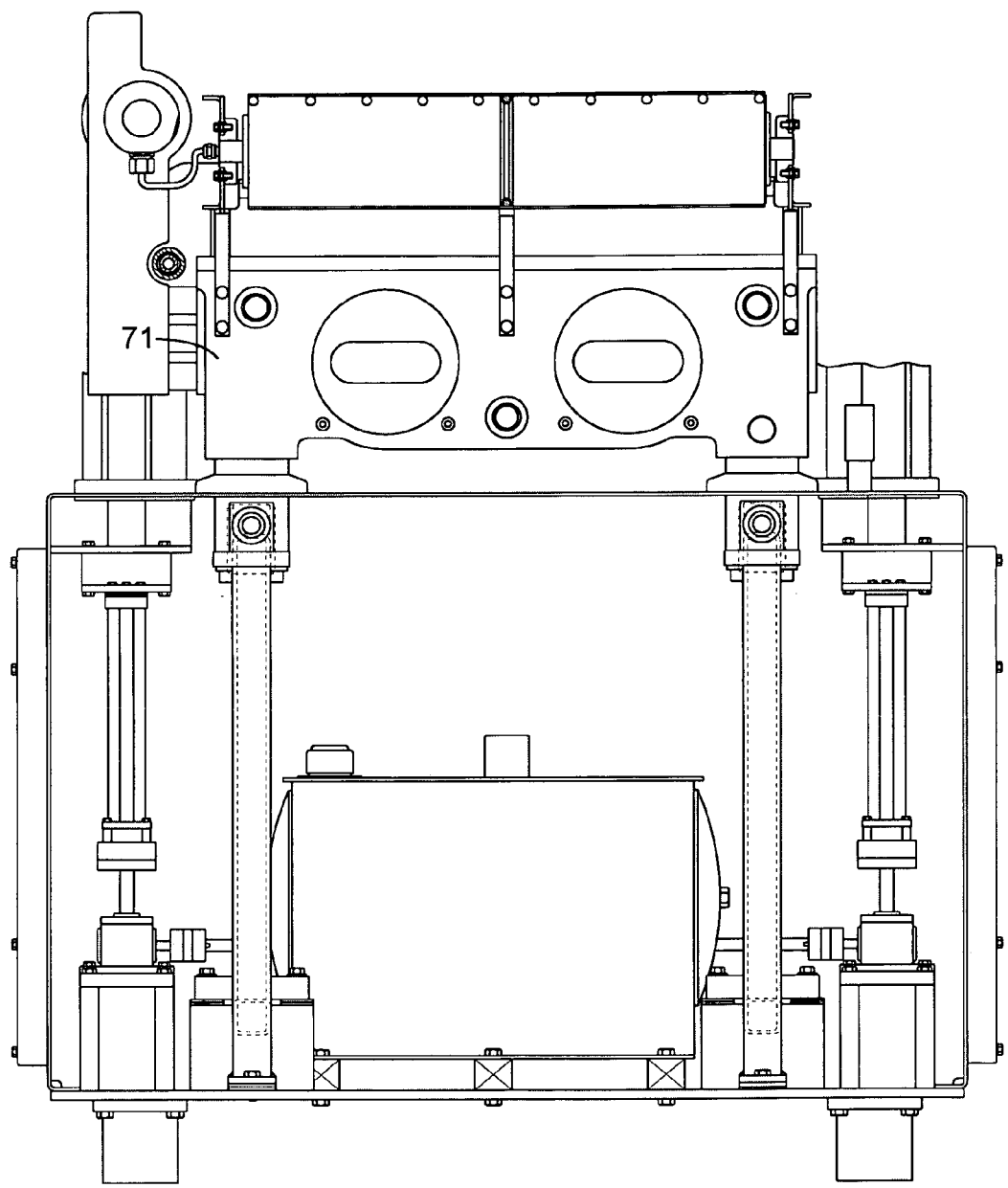
FIG. 11 is a fragmentary sectional view taken generally along line 11—11 of FIG. 2, with portions of the apparatus removed for clarity of depiction.

At a rear of the apparatus, as shown in FIGS. 10 and 12a crank lever 614 is provided that is keyed by a key 614a to the shaft 602.

A large threaded lock nut or lock collar 615 is threaded tightly onto a threaded end of the shaft and locked with a set screw 615a. The crank lever 614 is pivotally connected at a distal end to an actuator, such as a hydraulic cylinder 616. The cylinder 616 is pivotally connected at an opposite end thereof to an anchor lug 618 fixed to the base plate 21a. The cylinder is signal-connected via a hydraulic/electronic interface to the machine controller. Expansion of the cylinder 616 causes the crank lever 614 to be turned counterclockwise (FIG. 10) by about 85 degrees to the position shown as 614aa. The shaft 602 is thus turned about 85 degrees, as is the hopper 25 to the position marked 25aa.

By rotating the hopper 25 to the position shown as 25aa, the conveyor belt 31 is exposed for cleaning or removal. The plate 613, being a part of the hopper assembly, pivots with the hopper 25, as does the frame 42.

Figure 4:
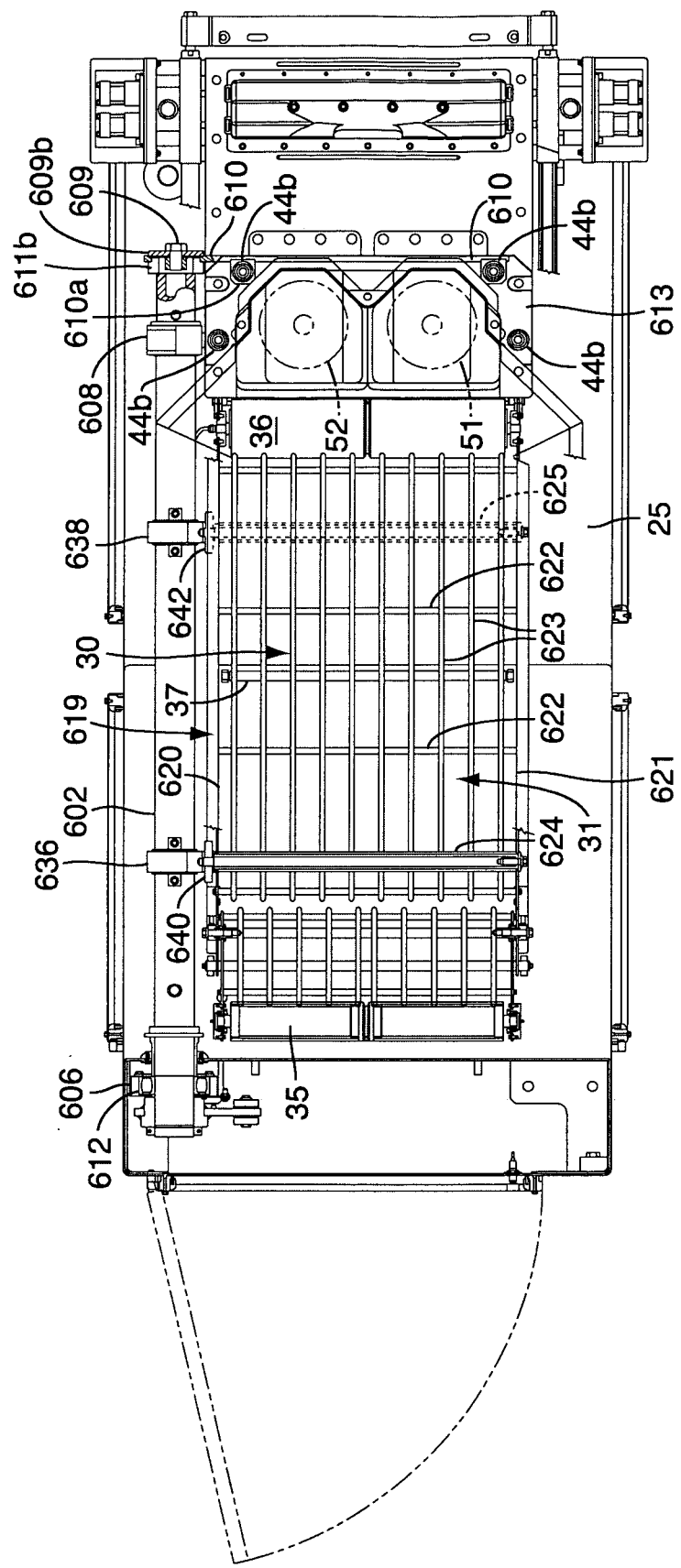
FIG. 4 is a sectional view taken generally along line 4—4 of FIG. 2, with some components and/or panels removed for clarity.

As a further aspect of the embodiment, as shown in FIGS. 2 and 4, the conveyor 30 includes a frame 619 having a hinge-side sidewall 620, an opposite-side sidewall 621, a plurality of lateral tie rods 622, a plurality of longitudinal ribs 623 supported on the tie rods 622, and two lateral tie rod beams 624, 625. The lateral tie rods 622 and the tie rod beams 624, 625 each have surrounding sleeves or spacers between the sidewalls 620, 621 and are fixed at opposite ends by nuts or the like to the sidewalls 620, 621. The conveyor frame 619 is simply supported on the machine base along the opposite-side sidewall 621.

Two intermediate fixtures 636, 638 (FIGS. 4, 10B-10D) are welded or otherwise fixed to the wall 620 of the conveyor and surround the shaft 602. The intermediate fixtures 636, 638 are rotatable with respect to the shaft 602 about the axis of the shaft 602. The fixtures 636, 638 have cross pins 640, 642 respectively. The fixtures are in two pieces that are assembled around the shaft using fasteners 643. Two lift pins 644, 646 with enlarged heads extend from the shaft adjacent opposite sides of each fixture 636, 638. The pins are press fit and fixed into bores in the shaft 602 by fasteners 648. During rotation of the shaft 602 by about 85 degrees for the hopper 25 to assume the position indicated as 25aa in FIG. 10, the pins 644, 646 sweep a first portion of the 85 degrees freely until contact is made with the pins 640, 642. The pins 644, 646 sweep the last portion of the 85 degrees, lifting the pins 640, 642 and rotating the conveyor upward about 13 degrees. This raises the conveyor from its support on the opposite-side 621 of the frame 619. At this position, the conveyor can be cleaned or repaired as required. The surface area beneath the conveyor belt can be cleaned as well. The conveyor belt 31 can be removed and/or cleaned.

Although the 85 degree hopper tilt and 13 degree conveyor tilt are advantageous, it is anticipated that other angular tilts such as 45 degrees–90 degrees for the hopper and 10 degrees–30 degrees for the conveyor may be advantageous as well. The location and size or shape of the pins 644, 646 can be adjusted to select the hopper and conveyor tilt amounts.

The hopper 25 and conveyor 30 are pivoted by the actuator 616 via the machine controller, particularly by instructions give to the controller via the control panel 19.

The hopper tilt system is configured such that apparatus can be easily factory converted from a right side operating apparatus to a left side operating apparatus, that is, the hopper assembly is factory reversible across the longitudinal centerline of the apparatus. For example the crank lever 614 comprises a lever arm 614b that is welded to a collar 614c that is secured to the shaft 602. In the factory, the lever arm 614b can easily be switched for a right side operation by flipping over the lever arm and welding the lever arm the collar. The remaining shaft supports and brackets can be reused for mounting the system on the opposite side of the machine. Parts needing to be designed and manufactured can be reduced, given the bidirectional feature of the design.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. In a food patty molding apparatus having a food product hopper configured for containing a supply of food product and in flow-communication with a food delivery apparatus for discharging food product from said hopper, the improvement comprising: a housing; said a hopper having a surrounding sidewall and an open bottom, said hopper carried by said housing, said hopper having a longitudinal dimension along a longitudinal direction and a lateral dimension, said housing and said hopper elongated along said longitudinal direction; wherein said food delivery apparatus comprises a conveyor having a top conveying surface closing a substantial portion of said open bottom, said top conveying surface configured to transport product within said hopper in the longitudinal direction; and a hinge arrangement having a hopper pivot axis parallel to said longitudinal direction, said hinge arrangement carried between said hopper and said housing, said hinge arrangement configured to allow said hopper to pivot with respect to said housing from an operative position to an upwardly tilted position, wherein said converyor is pivotally carried on said housing about a conveyor pivot axis that is parallel to or collinear with said hopper pivot axis to allow an upward tilting of said conveyor when said hopper is tilted upward, exposing said conveyor for cleaning.

2. The improvement according to claim 1, wherein said hinge arrangement comprises a hinge shaft fixed to said hopper and at least one support carried by said housing, said support having an aperture wherein said hinge shaft is journaled for rotation about said hopper pivot axis by said aperture.

3. The improvement according to claim 2, comprising an actuator operatively connected to said hinge arrangement to pivot said hopper.

4. The improvement according to claim 1, wherein said hinge arrangement comprises a hinge shaft fixed to said hopper and at least one support carried by said housing, said support having an aperture wherein said hinge shaft is journaled for rotation about said hopper pivot axis by said aperture, and comprising a lever fixed to said shaft, and an actuator connected to a position on said lever eccentrically located with respect to said hopper pivot axis, said actuator operative to exert a force on said lever to rotate said shaft.

5. The improvement according to claim 1, comprising an actuator operatively connected to said hopper to pivot said hopper.

6. The improvement according to claim 1, comprising an actuator arranged to pivot said conveyor about said conveyor pivot axis.

7. The improvement according to claim 1, wherein said hinge arrangement comprises a hinge shaft fixed to said hopper and at least one support carried by said housing, said support having an aperture wherein said hinge shaft is journaled for rotation about said hopper pivot axis by said aperture, and comprising an actuator arranged to pivot said conveyor about said conveyor pivot axis.

8. THe improvement according to claim 1, comprising an actuator operatively connected to said hopper to pivot said hopper, and said actuator operatively connected to said conveyor to pivot said conveyor, said actuator operative to pivot said hopper to an angle greater than 45 degrees and said conveyor to a lesser angle.

9. The improvement according to claim 8, wherein said actuator is configured to pivot said conveyor about 30 degrees or less.

10. The improvement according to claim 1, wherein said hinge arrangement comprises a hinge shaft fixed to one of said hopper and said housing, and a shaft support carried by the respective other of said hopper and said housing, said support having an aperture wherein said hinge shaft is journaled for rotation about said hopper pivot axis.

11. The improvement according to claim 10, comprising an actuator operatively connected to said hopper at a position eccentric with respect to said hopper pivot axis, said actuator operative to exert a force on said hopper away from said conveyor.

12. The improvement according to claim 11, wherein said conveyor is arranged to pivot about said hopper pivot axis.

13. The improvement according to claim 11, wherein said actuator is arranged to pivot said conveyor about said conveyor pivot axis.

14. The improvement according to claim 11, wherein said actuator is operatively connected to said conveyor, said actuator operative to pivot said hopper to a hopper angle greater than 45 degrees about said hopper pivot axis and said conveyor by a conveyor angle less than said hopper angle.

15. The improvement according to claim 14, wherein said actuator is configured to pivot said conveyor about 30 degrees or less.

16. A food patty molding apparatus, comprising: a housing; a food product hopper having a surrounding sidewall configured for containing a supply of food product and an open bottom said hopper carried by said housing, said hopper having a longitudinal dimension along a longitudinal direction and a lateral dimension, said housing and said hopper elongated along said longitudinal direction; a conveyor having a top conveying surface closing a substantial portion of said open bottom, said top conveying surface for transporting food product within said hopper in the longitudinal direction; a food patty molding mechanism that receives food product from said conveyor and molds individual patties from said food product; a hinge arrangement having a hopper pivot axis parallel to said longitudinal direction, said hinge arrangement carried between said hopper and said housing, said hinge arrangement configured to allow said hopper to pivot with respect to said housing from an operative position to a maintenance position, wherein said conveyor is pivotally carried on said housing about a conveyor pivot axis that is parallel to or collinear with said hopper pivot axis to allow an upward tilting of said conveyor when said hopper is tilted upward, exposing said conveyor for cleaning.

17. The apparatus according to claim 16, wherein said hinge arrangement comprises a hinge shaft fixed to said hopper and at least one support carried by said housing, said support having an aperture wherein said hinge shaft is journaled for rotation about said hopper pivot axis by said aperture.

18. The apparatus according to claim 16, wherein said food patty molding mechanism comprises a food pump that pressurizes food product received from said conveyor, and a reciprocating mold plate having patty-forming cavities therein that receive pressurized food product from said food pump, and a knock out mechanism that mechanically removes formed patties from said cavities.

19. The apparatus according to claim 16, wherein said hinge arrangement comprises a hinge shaft fixed to said hopper and at least one support carried by said housing, said support having an aperture wherein said hinge shaft is journaled for rotation about said hopper pivot axis by said aperture, and comprising a lever fixed to said shaft, and an actuator connected to a position on said lever eccentrically located with respect to said hopper pivot axis said actuator operative to exert a force on said lever to rotate said shaft.

20. The apparatus according to claim 16, comprising an actuator arranged to pivot said conveyor about said hopper pivot axis.

21. The apparatus according to claim 16, wherein said hinge arrangement comprises a hinge shaft fixed to said hopper and at least one support carried by said housing, said support having an aperture wherein said hinge shaft is journaled for rotation about said hopper pivot axis by said aperture, and comprising an actuator arranged to pivot said conveyor about said conveyor pivot axis.

22. The apparatus according to claim 16, an actuator operatively connected to said hopper to pivot said hopper and to said conveyor to pivot said conveyor, said actuator operative to pivot said hopper to an angle greater than 45 degrees and said conveyor to a lesser angle.

23. The apparatus according to claim 22, wherein said actuator is configured to pivot said conveyor about 30 degrees or less.

24. The apparatus according to claim 16, wherein said hopper comprising a unitary part.

25. The apparatus according to claim 16, further comprising a level sensing mechanism located in said hopper, said level sensing mechanism comprising a food material engaging member arranged to be moved by food product within said hopper, a pneumatic cylinder operatively connected to said engaging member and to said hopper, said pneumatic cylinder exerting a selectable resistance to movement of said engaging member, and a sensing element arranged to receive a mechanical signal corresponding to movement of said engaging member to sense level of food product within said hopper.

26. The improvement according to claim 25, wherein said engaging member is mounted to pivot with respect to said hopper, and wherein said engaging member comprises a food engaging leg and a bent-off leg, said pneumatic cylinder arranged to exert a force on said bent-off leg to oppose pivoting of said engaging leg under pressure from a level of food product within said hopper.

\* \* \* \* \*

UNITED STATES PATENT AND TRADEMARK OFFICE
CERTIFICATE OF CORRECTION

| | |
|---|---|
| PATENT NO. | : 7,210,923 B2 |
| APPLICATION NO. | : 10/942620 |
| DATED | : May 1, 2007 |
| INVENTOR(S) | : James E. Pasek et al. |

It is certified that error appears in the above-identified patent and that said Letters Patent is hereby corrected as shown below:

At column 11, line 8, change "12a" to --12 a--.

At column 13, line 11, change "THe" to --The--.

At column 13, line 29, change "hopper away" to --hopper to pivot said hopper away--.

Signed and Sealed this
Ninth Day of August, 2011

David J. Kappos
*Director of the United States Patent and Trademark Office*